US010042367B2

(12) United States Patent
McCarrick et al.

(10) Patent No.: US 10,042,367 B2
(45) Date of Patent: Aug. 7, 2018

(54) SYSTEM AND METHOD FOR MONITORING AND CONTROL FOR FLUID MANAGEMENT

(71) Applicant: SECO SYS Corporation, Valley Center, CA (US)

(72) Inventors: Henry J McCarrick, Valley Center, CA (US); Kevin E Burrow, Simi Valley, CA (US); James R Manely, Jr., Placerville, CA (US)

(*) Notice: Subject to any disclaimer, the term of this patent is extended or adjusted under 35 U.S.C. 154(b) by 504 days.

(21) Appl. No.: 14/700,117

(22) Filed: Apr. 29, 2015

(65) Prior Publication Data

US 2015/0316936 A1    Nov. 5, 2015

Related U.S. Application Data

(60) Provisional application No. 61/986,972, filed on May 1, 2014.

(51) Int. Cl.
| | |
|---|---|
| *G05D 7/00* | (2006.01) |
| *G05D 11/00* | (2006.01) |
| *G05D 7/06* | (2006.01) |
| *G01F 1/56* | (2006.01) |
| *G05B 15/02* | (2006.01) |
| *G01F 1/075* | (2006.01) |
| *G01F 15/06* | (2006.01) |

(52) U.S. Cl.
CPC ............. *G05D 7/0635* (2013.01); *G01F 1/56* (2013.01); *G05B 15/02* (2013.01); *G05D 7/0676* (2013.01); *G01F 1/075* (2013.01); *G01F 15/06* (2013.01)

(58) Field of Classification Search
CPC .... G05D 7/0635; G05D 7/0676; G05B 15/02; G01F 1/56; G01F 1/075; G01F 15/06
USPC ........................................................ 700/282
See application file for complete search history.

(56) References Cited

U.S. PATENT DOCUMENTS

| | | | |
|---|---|---|---|
| 2008/0082215 A1* | 4/2008 | McDowell | F17D 3/01 700/282 |
| 2009/0271045 A1* | 10/2009 | Savelle, Jr. | A01G 25/167 700/284 |
| 2011/0050395 A1* | 3/2011 | Ervin | F17D 5/02 340/6.11 |
| 2011/0190947 A1* | 8/2011 | Savelle, Jr. | G05D 11/02 700/284 |
| 2013/0080081 A1* | 3/2013 | Dugger | G01F 1/667 702/48 |
| 2014/0109644 A1* | 4/2014 | Carbone, II | G01F 25/0007 73/1.16 |

\* cited by examiner

*Primary Examiner* — Ziaul Karim
(74) *Attorney, Agent, or Firm* — Peter Ganjian; Patent Law Agency, LLC

(57) ABSTRACT

The present invention discloses an application specific operating profile (or use-profile) that includes functions based on one or more criteria specific to an environment within which fluid is managed. The functions include a set of attributes, the values of which enable management of fluid.

6 Claims, 29 Drawing Sheets

SYSTEM AND METHOD FOR MONITORING AND CONTROL FOR FLUID MANAGEMENT

CROSS-REFERENCE TO RELATED APPLICATIONS

This Application is a Non-Provisional Application that claims the benefit of priority of the U.S. Provisional Patent Application 61/986,972 with a filing date 1 May 2014, the entire disclosures of which is expressly incorporated by reference in its entirety herein. It should be noted that where a definition or use of a term in the incorporated patent applications is inconsistent or contrary to the definition of that term provided herein, the definition of that term provided herein applies and the definition of that term in the incorporated patent applications does not apply.

BACKGROUND OF THE INVENTION

Field of the Invention

One or more embodiments of the present invention are related to fluid management systems and methods thereof.

Description of Related Art

Regrettably, most conventional metering mechanisms are merely single metric devices that are specifically designed to perform a single function, and are engineered and used for a single application. For example, a conventional water meter is a metering mechanism that has a single function that provides a single unit of measurement (a single metric), which is the volume of water used. A conventional water meter may comprise of mechanical register with limited functionality in that they merely provide a metric or measure for volume of water passed the meter and not much more.

Accordingly, in light of the current state of the art and the drawbacks to current metering mechanisms mentioned above, a need exists for a single, compact, intelligent fluid management apparatus that is easily adapted for management of fluid in different applications. Stated otherwise, a need exists for systems and methods that would provide a vast array of metrics and functionalities within the context of different applications or environments for monitor, control, and overall management of fluid using a single, compact intelligent fluid management apparatus.

BRIEF SUMMARY OF THE INVENTION

A non-limiting, exemplary aspect of one or more embodiments of the present invention provides a method and a system for management of fluid, comprising:
one or more use-profiles that operate based on a predetermined set of ranges of values of a set of flow characteristics of a flow profile of a fluid.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

DETAILED DESCRIPTION OF THE INVENTION

Figure 1:
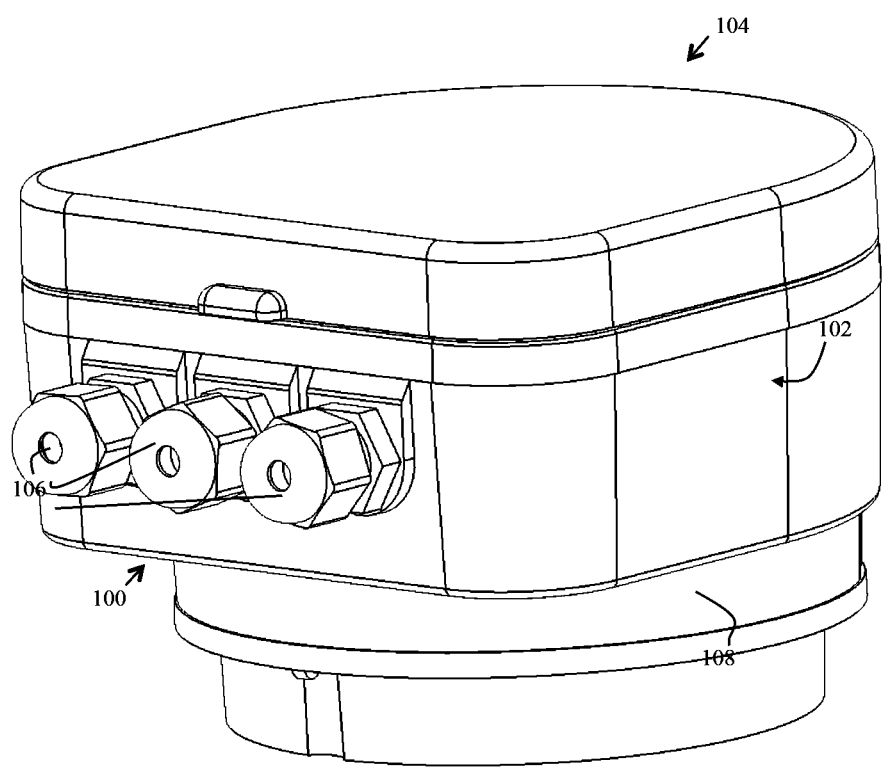
FIG. 1 is a non-limiting, exemplary illustration of a compact, intelligent fluid management apparatus that includes systems and methods that provide a vast variety of functionalities for monitor, control, and overall management of fluid in accordance with one or more embodiments of the present invention.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

For purposes of illustration, programs and other executable program components are illustrated herein as discrete blocks, although it is recognized that such programs and components may reside at various times in different storage components, and are executed by the data processor(s) of the computers. Further, each block within a flowchart may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

Throughout the disclosure, the term fluid may be construed as any substance or material that has no fixed shape and yields to external pressures. Non-limiting examples of fluids may include liquids such as water, gases, fluidized solids (slurries), etc., or combinations thereof.

Fluid management is application specific with each application requiring different set of criteria for proper management of fluid specific for that application. In other words, set of criteria needed to properly manage fluid vary and are application specific, depending upon the environment within which fluid is to be managed. Stated otherwise, certain required criteria important for proper management of fluid in one environment may not be an issue or relevant in another environment. For example, set of criteria needed to properly manage fluid in an irrigation environment would require metrics related to certain characteristics that are specific to the irrigation application, a non-limiting example of which may include rate and amount of evaporation of water. On the other hand, for proper management of fluid in an indoor environment (e.g., indoor plumbing of a residential dwelling) may require rate and amount of flow, and not require criteria related to "evaporation." Accordingly, metrics and the metering and control equipment used to derive the values for the metrics and control fluid in one environment may not be applicable to another environment. Without the use of any one of the one or more embodiments of the present invention, an aggregate of different metering devices or equipments must be used for proper management of fluid in a single, specific environment.

One or more embodiments of the present invention provide a single, compact, intelligent fluid management apparatus that is easily adapted for management of fluid in different applications without the use of aggregated metering devices. Further, one or more embodiments of the present invention provide systems and methods that provide a vast array of metrics and functionalities within the context of different applications or environments for monitor, control, and overall proper management of fluid using the single, compact intelligent fluid management apparatus.

FIG. 1 is a non-limiting, exemplary illustration of a compact, intelligent fluid management apparatus that includes systems and methods that provide a vast variety of functionalities for monitor, control, and overall management of fluid in accordance with one or more embodiments of the present invention. As illustrated, the intelligent fluid management apparatus 100 has a waterproof housing 102 with cover 104, with one or more waterproof input/output ports 106 for coupling various external devices (detailed below). As detailed below, fluid management apparatus 100 may optionally be detachably coupled with a mounting adapter 108 that enables fluid management apparatus 100 to couple with a flow indicator device 202 (detailed below). It should be noted that mounting adapter 108 may be varied depending on the type of interlocking connectivity 212 provided by the flow indicator 202.

Fluid management apparatus 100 is easily adapted for management of fluid in different applications, and provides a vast array of metrics and functionalities that may be used within the context of different applications or environments for monitor, control, and overall proper management of fluid using the single, compact intelligent fluid management apparatus. Fluid management apparatus 100 may be set to monitor fluid flow and control flow based on the application requirements of the service for which it has been installed. Fluid management apparatus 100 is network enabled and may communicate and exchange data with external devices to satisfy various fluid management functionalities.

FIGS. 2A to 2D are non-limiting, exemplary illustration of fluid management apparatus in combination with a conventional flow indicator mechanism in accordance with one or more embodiments of the present invention. As illustrated in FIGS. 2A to 2D, fluid management apparatus 100 may be coupled with a conventional flow indicator 202 via mounting adapter 108, replacing the conventional mechanical register to provide a flexible fluid management system that can be easily scaled to any size fluid delivery requirement, scaling from a fractional Units of Measure (UOM) per unit of time to thousands of UOM per unit of time. Non-limiting examples of a UOM may be volume, mass, etc. such as gallons or Kilograms, etc.

As detailed below, a simple menu selection allows users to select a calibration of fluid management apparatus 100 with manufacturer set predetermined parameters of fluid indicator 202. As further detailed below, fluid management apparatus 100 can exercise a vast array of user set limits for each selected profile type (detailed below), non-limiting, non-exhaustive listings of which may include, High flow rate, Low flow rate, Detected leak rate, Flow volume limit, Flow duration limit, Flow episode limit, etc.

Figure 2A:
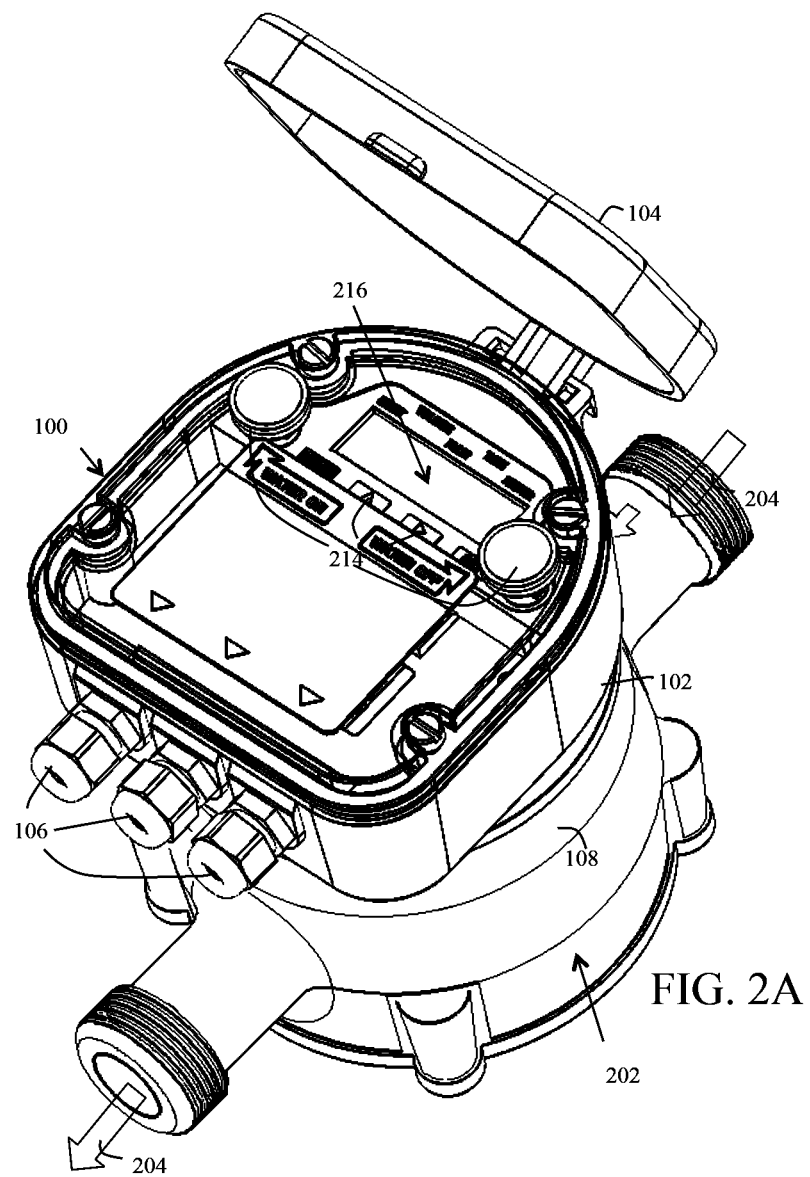
FIGS. 2A to 2D are non-limiting, exemplary illustration of fluid management apparatus in combination with a conventional flow indicator mechanism in accordance with one or more embodiments of the present invention.
Figure 2B:
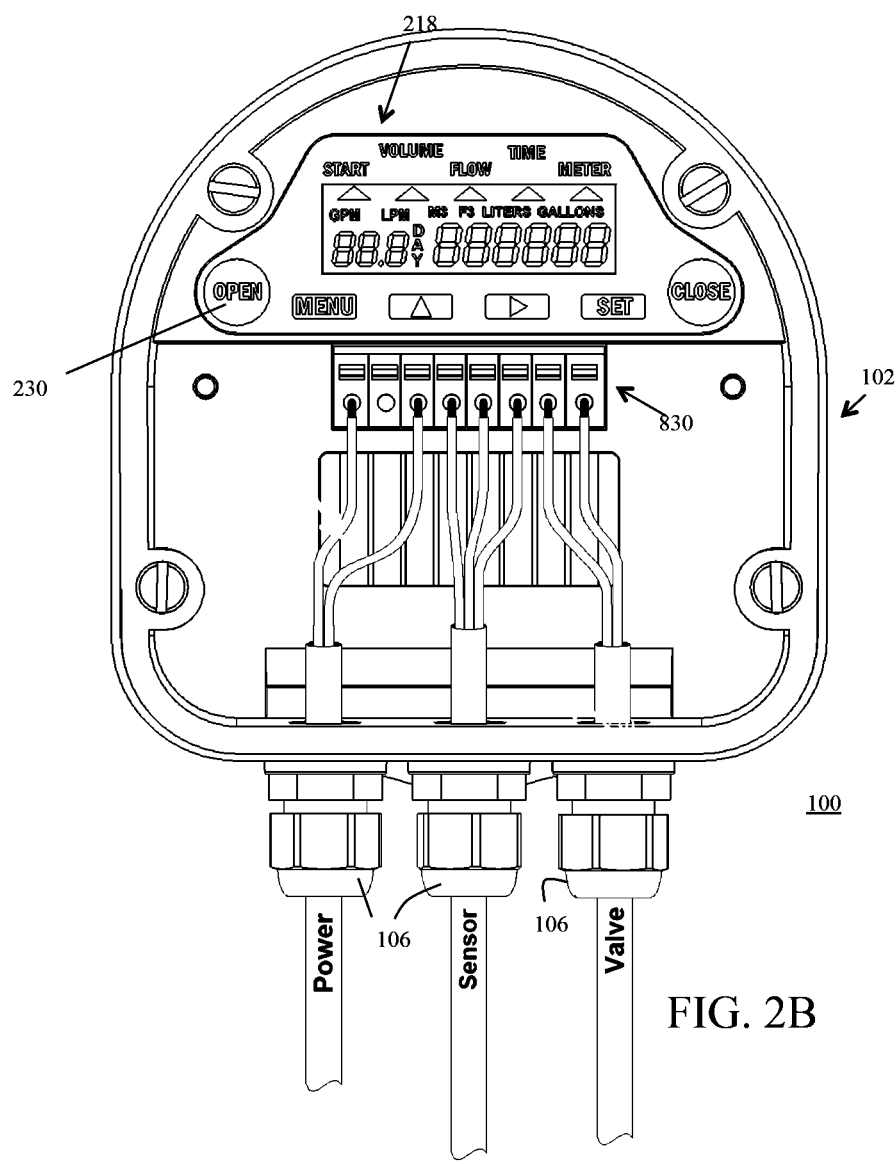
Figure 2C:
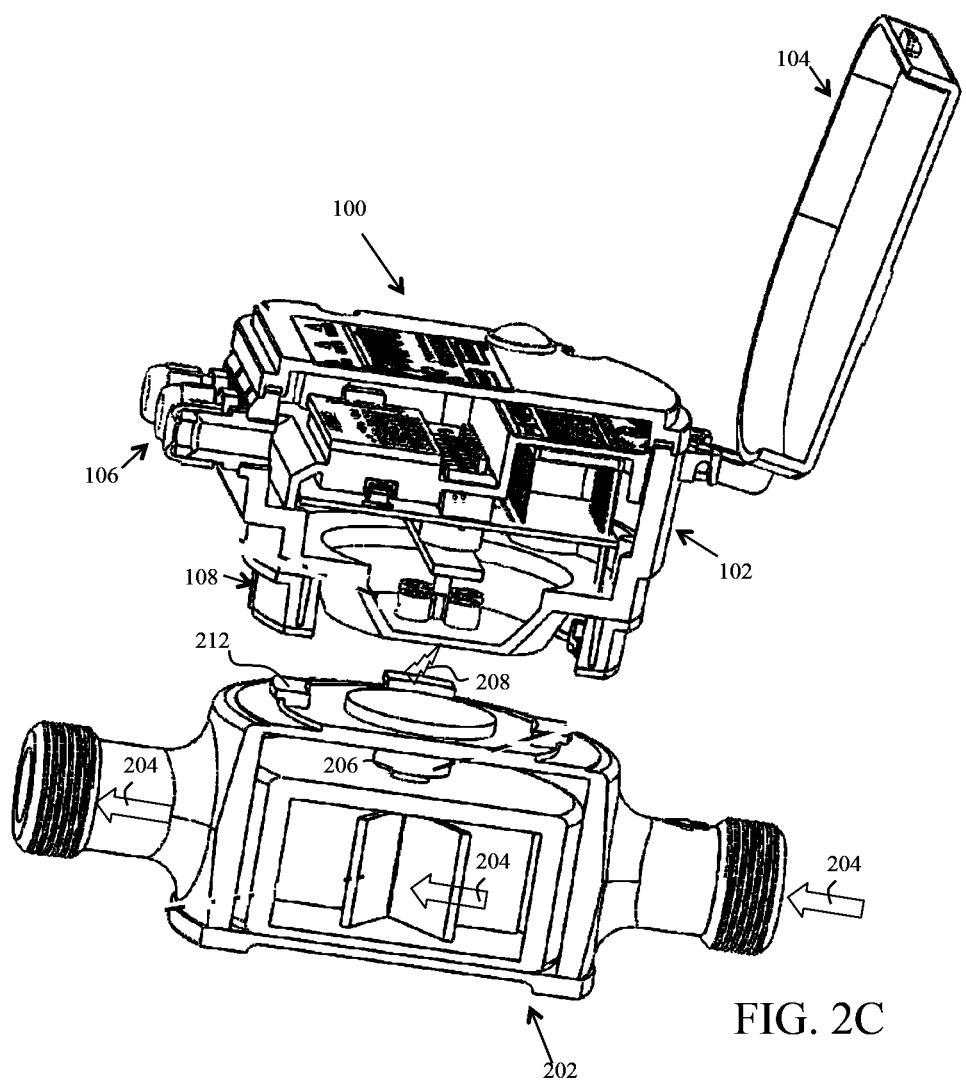
Figure 2D:
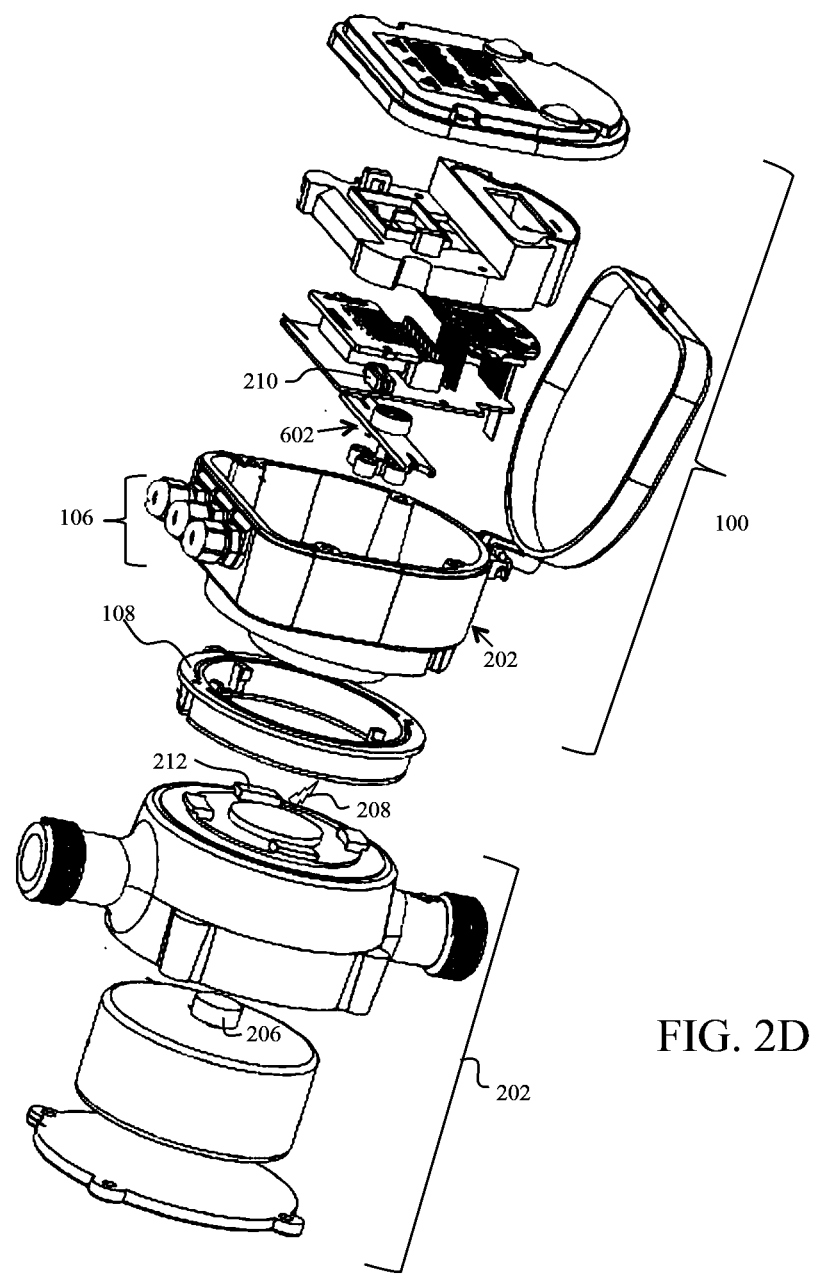

As illustrated in FIGS. 2A to 2D, fluid management apparatus 100 is comprised of housing 102 that is associated with a conventional flow indicator 202 via mounting adapter 108. In general, flow indicators 202 are very well known, have been in use for a number of years, and are used to provide indication of flow of fluid or lack thereof in a variety of different methods, non-limiting, non-exhaustive listing of examples of which may include the use of magnets, optical devices, pulse-based indicators, ultrasonic indicators, or others, any one of which may be used with one or more embodiments of the present invention. As a non-limiting, specific example, flow indicator 202 may use magnets 206 to generate variations in magnetic filed 208 as an indication or representation of fluid flow 204 (as shown in FIGS. 2A to 2C). That is, flow indicator 202 may comprise of one or more magnets 206 that move (e.g., rotate) as fluid 204 flows through flow indicator 202, with the movement of the magnets 206 generating variations in the magnetic field 208.

Regardless of the type of flow indicator 202 used, one or more embodiments of the fluid management apparatus 100 provide a flow meter interface module 210 that is operatively coupled with flow indicator 202 to detect representations of indications of flow of fluid 204 by the flow indicator 202. For example, a non-limiting, exemplary embodiment of fluid management apparatus 100 may use a flow meter interface module 210 that is comprised of a magnetic field sensor module 402 to detect the magnetic field variations 208 generated by the flow indicator 202. A non-limiting example of a magnetic field sensor module 402 may include for example, a Hall-effect sensor module 406. As another example, if flow indicator 202 that is used generates variations in ultrasound as an indication or representation of flow of fluid 204, a flow meter interface module 210 of fluid management apparatus 100 used may instead optionally comprise of an ultrasonic sensor. According, a type of flow meter interface module 210 of fluid management apparatus 100 used in accordance with one or more embodiments of fluid management apparatus 100 depends on the type of flow indicator 202 used and should not be limited to a magnetic field sensor.

It should be noted that although FIGS. 2A to 2D illustrate the use of conventional flow indicator 202 to provide fluid flow information to fluid management apparatus 100, other external flow metering devices may equally be used and connected to intelligent fluid management apparatus 100 by the input/output ports 106 and via the connectivity port 830. In other words, as illustrated in FIG. 1, fluid management apparatus 100 may be used as a standalone device with external, conventional flow indicator device sensors coupled directly through input/output ports 106 instead of that which is illustrated in FIGS. 2A to 2C and detailed below. Non-limiting, non-exhaustive listing of examples of flow indicator devices may include, for example, paddle wheel flow sensors, electronic flow sensor, etc. Accordingly, the same flow information obtained from a conventional flow indicator 202 may be obtained using well known external flow sensors (or flow metering devices) coupled with the input/output ports 106, which would directly forward flow data signals to a Central Process Unit (CPU) 302 of fluid management device 100. As further illustrated in FIGS. 2A to 2C, housing 202 further accommodates the remaining electronics modules of fluid management apparatus 100 in a waterproof manner.

Figure 3A:
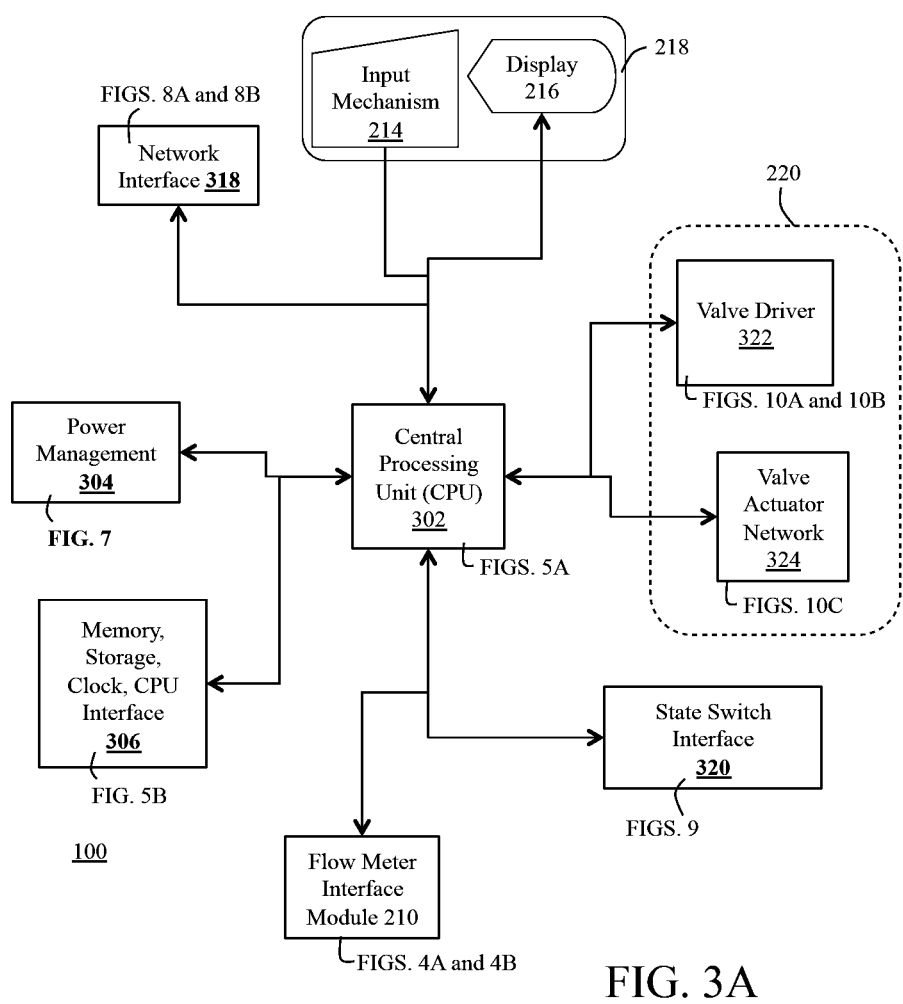
FIG. 3A is a non-limiting, exemplary block diagram illustrating the various components or modules of the fluid management apparatus in accordance with one or more embodiment of the present invention.
Figure 3B:
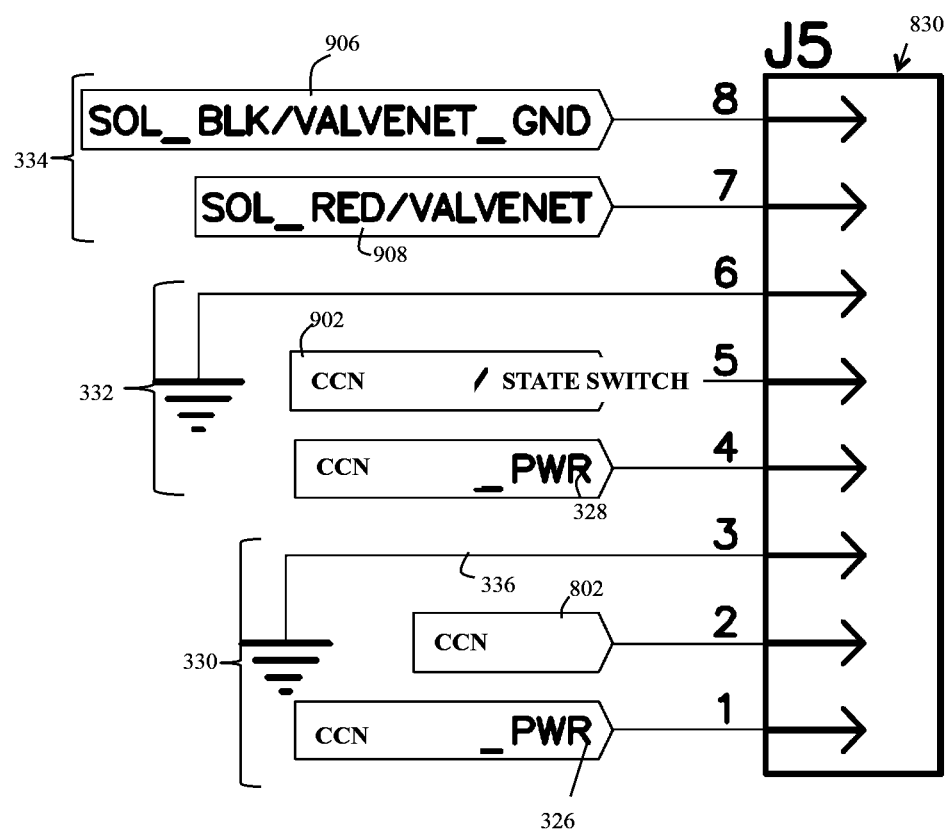
FIG. 3B is a connectivity port that enables the fluid management apparatus to communicate with external devices using wired connections.

FIG. 3A is a non-limiting, exemplary block diagram illustrating the various components or modules of the fluid management apparatus in accordance with one or more embodiment of the present invention, and FIG. 3B is a connectivity port that as detailed below enables the fluid management apparatus to communicate with external devices using wired connections. As illustrated in FIGS. 3A and 3B and further detailed below, fluid management apparatus 100 includes a User Interface (UI) 218 comprised of a well known LCD display 216 and well known input mechanisms 214 (e.g., ON and OFF switches or keypads, including various secondary switches or keypads). It should be noted that the UI 218 may be easily implemented as a touch screen or other well-known user interfaces 218 in well-known manner. Accordingly, the mechanisms 214 and 216 of UI 218 by which a user interacts with fluid management apparatus 100 may easily be modified. In general, any one or more of the input mechanisms 214 may be used for selecting a vast variety of profiles, their respective functions, including setting values for various attributes of each function for system configuration to setup fluid management device 100 for a specific application or environment by an end user.

As further illustrated in FIG. 3A, fluid management apparatus 100 includes a flow meter interface module 210 that is operatively associated with flow indicator 202 to detect indications of flow from the flow indicator 202, and provide electric signals indicative of the flow of fluid 204. Fluid management apparatus 100 also includes a CPU 302, including well-known memory/storage 310, clocking 312, CPU interface module 306 used by the CPU 302, and programming header 314 with the non-limiting, exemplary implementations illustrated in FIGS. 5A and 5B. The CPU interface unit 308 of module 306 illustrated in FIG. 5B may for example, include Analog to digital (A/D) or Digital to Analog (D/A) converters that may be used to convert analog signals from various devices to digital signals for processing by the CPU 302 and convert CPU 302 digital signals into analog signals to derive an analog device.

Figure 7:
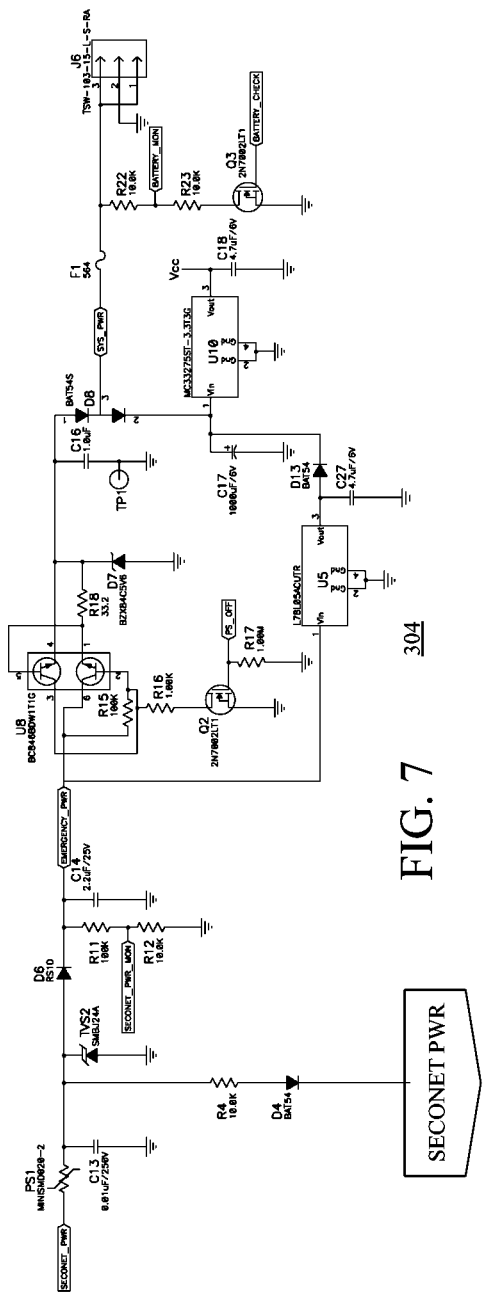
FIG. 7 is a non-limiting, exemplary illustration of implementation for power management and supply in accordance with one or more embodiments of the present invention.

Fluid management apparatus 100 further includes a well-known power management module 304, a non-limiting, exemplary implementation of which is illustrated in FIG. 7 that provides power via terminals 326 and 328 of connectivity port 830 illustrated in FIGS. 2B and 3B. Further included is a network interface module 318, a non-limiting, exemplary implementation of which is illustrated in FIG. 8B, which enables fluid management apparatus 100 to network with one or more external devices, best illustrated in FIG. 8A.

Figure 9:
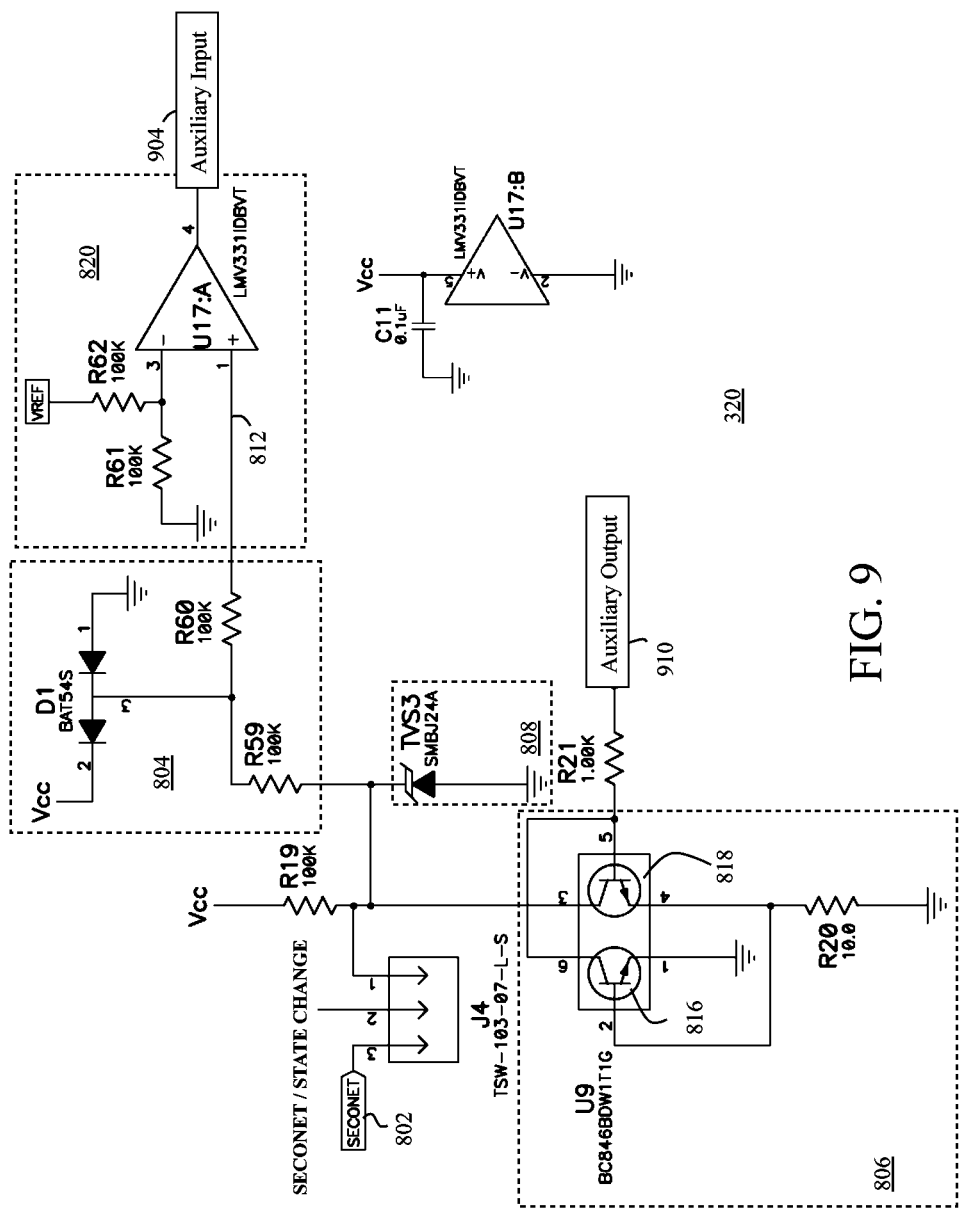
FIG. 9 is a non-limiting, exemplary implementation of a switching interface module in accordance with one or more embodiments of the present invention.

Switching interface module 320 illustrated in FIG. 3A, non-limiting, exemplary implementation of which is illustrated in FIG. 9, enables connection of switching devices via terminal set 332 of connectivity port 830 to fluid management apparatus 100. Non-limiting, non-exhaustive, listing of examples of switching devices may include, for example, a level sensor, pressure sensor, a moisture sensor, or other similar devices that can switch states based on one or more parameters.

Figure 10A:
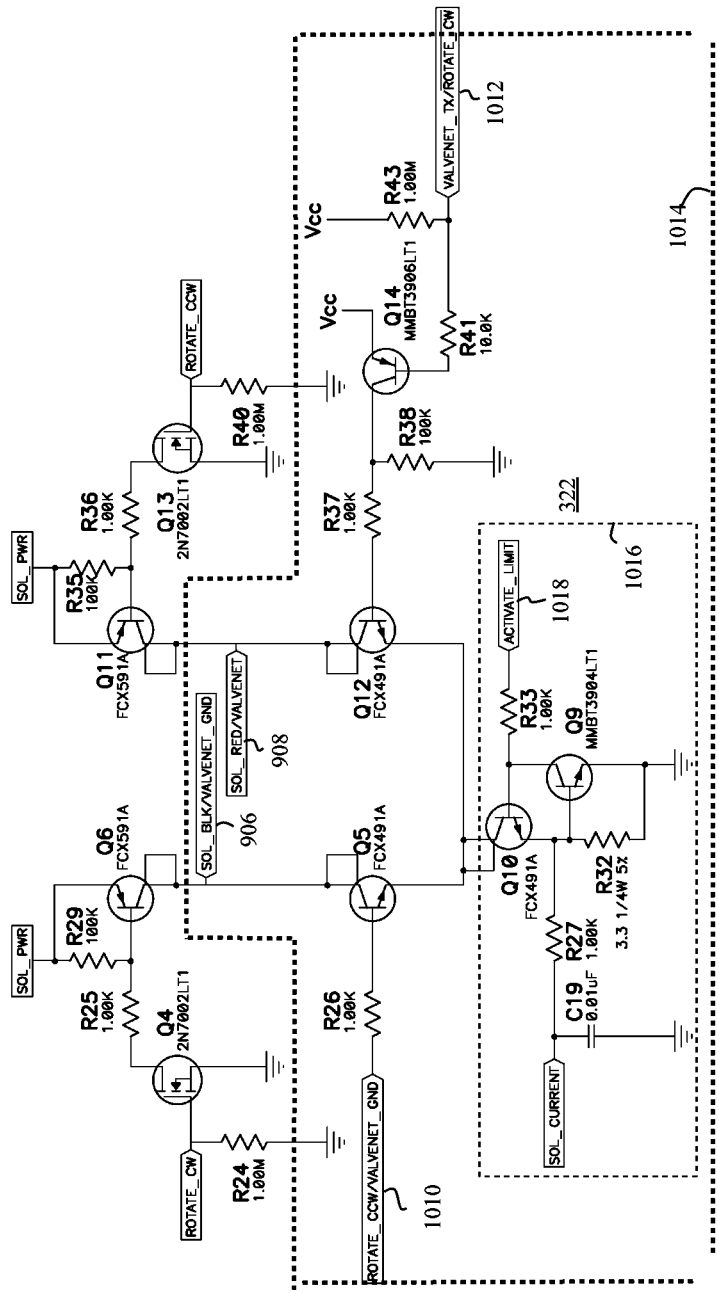
FIGS. 10A and 10B are a non-limiting, exemplary implementation of a valve driver module in accordance with one or more embodiments of the present invention.
Figure 10B:
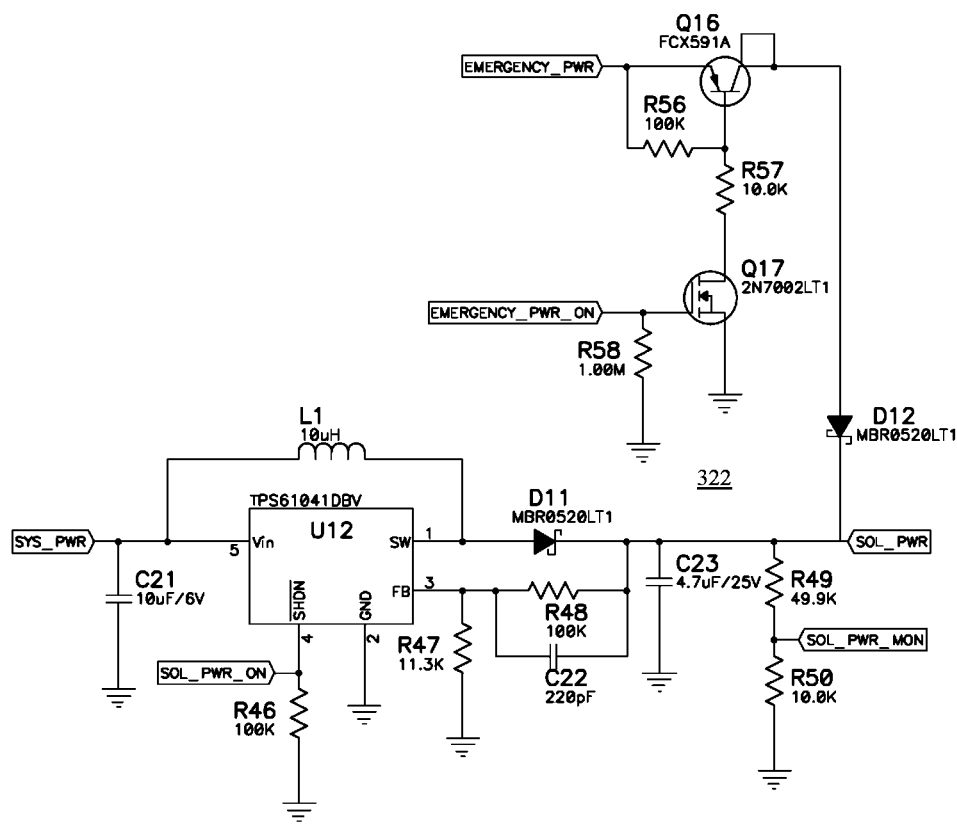
Figure 10C:
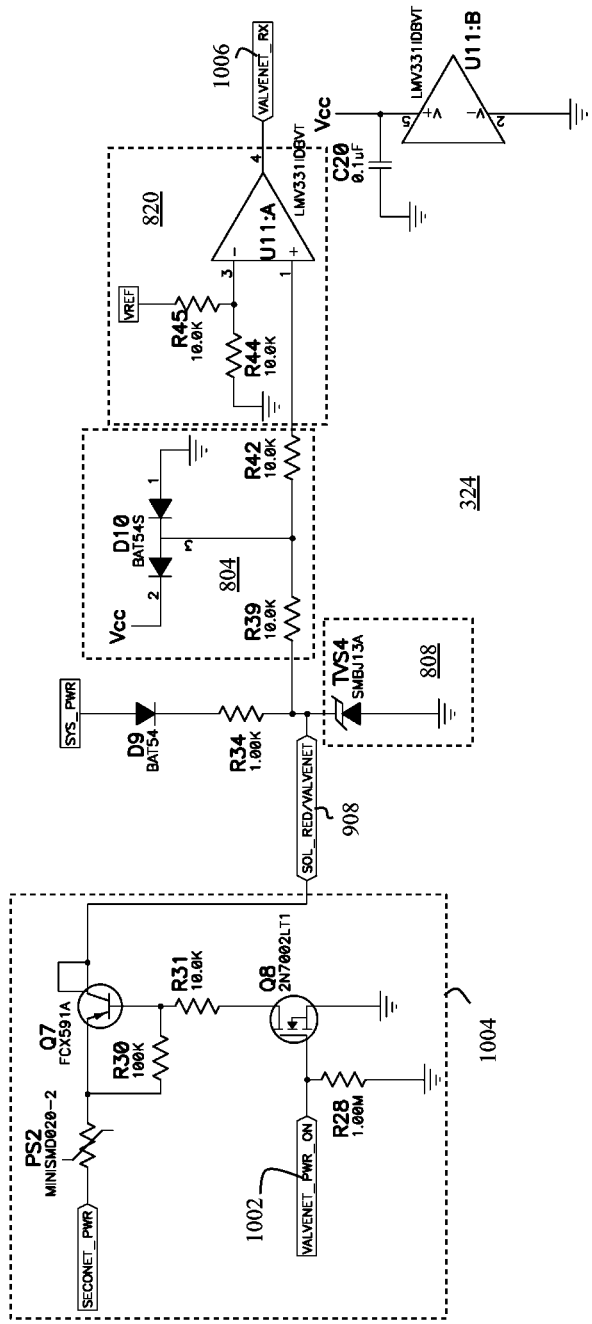
FIG. 10C is a non-limiting, exemplary implementation of a valve actuator network module (in conjunction with FIGS. 10A and 10B) in accordance with one or more embodiments of the present invention.

As further illustrated in FIG. 3A, fluid management apparatus 100 includes a valve operations module 220 that include a valve driver module 322, a non-limiting, exemplary implementation of which is illustrated in FIGS. 10A and 10B, and a valve actuator network 324, a non-limiting, exemplary implementation of a which is illustrated in FIG. 10C. Valve driver module 322 under the control of CPU 302 drives a single valve (via terminal set 334 of connectivity port 830, best illustrated in FIG. 3B) to control actual flow of fluid 204. Fluid management apparatus 100 also includes a valve actuator network 324 that enable a plurality of valves to be actuated under the control of CPU 302 (via terminal set 334 of connectivity port 830). Various terminal sets, including individual terminals of the connectivity port 830 illustrated in FIG. 3B is detailed below.

Figure 4A:
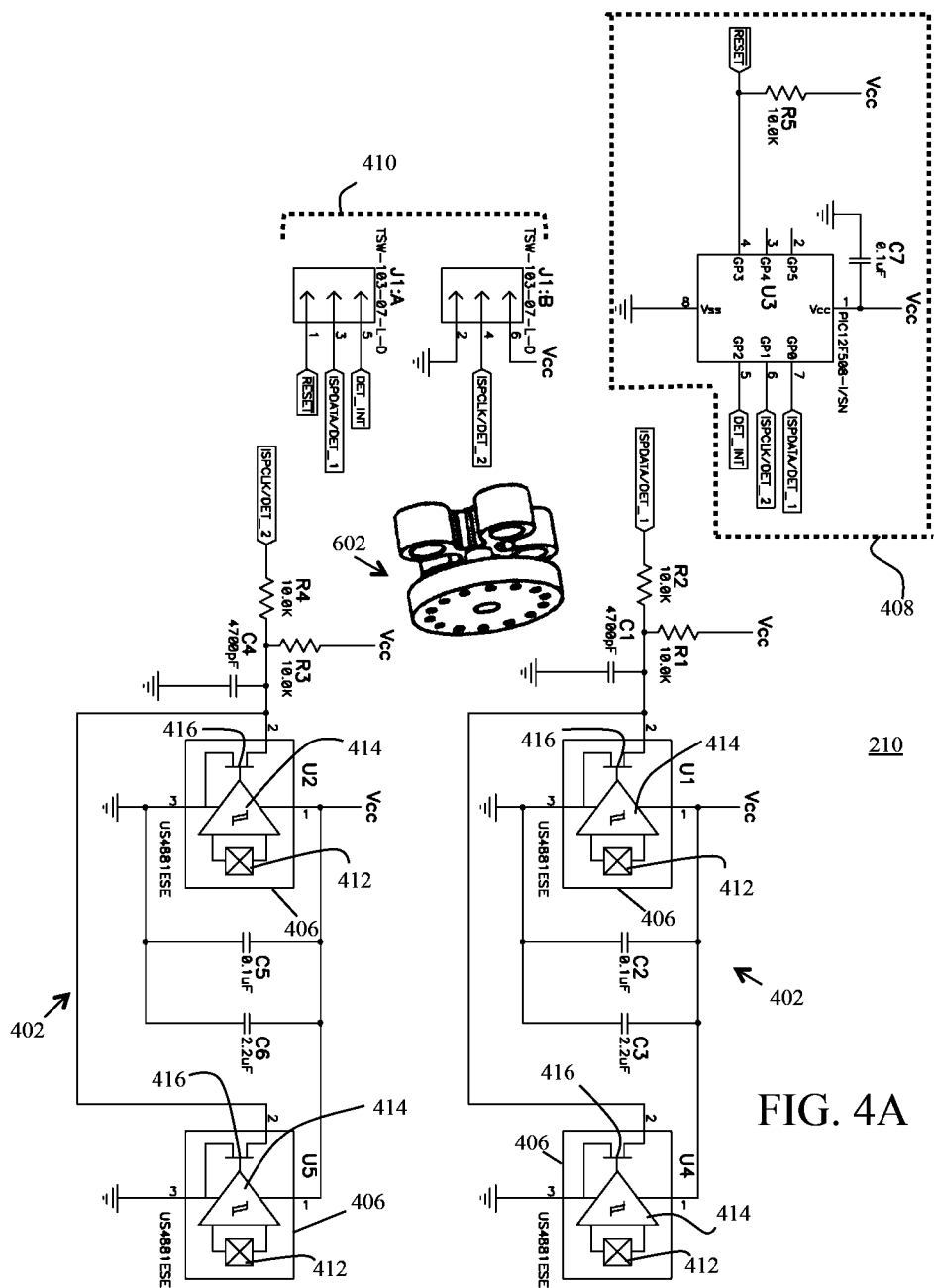
FIGS. 4A and 4B are non-limiting, exemplary implementation of a flow meter interface module of the flow management apparatus in accordance with one or more embodiments of the present invention.
Figure 4B:
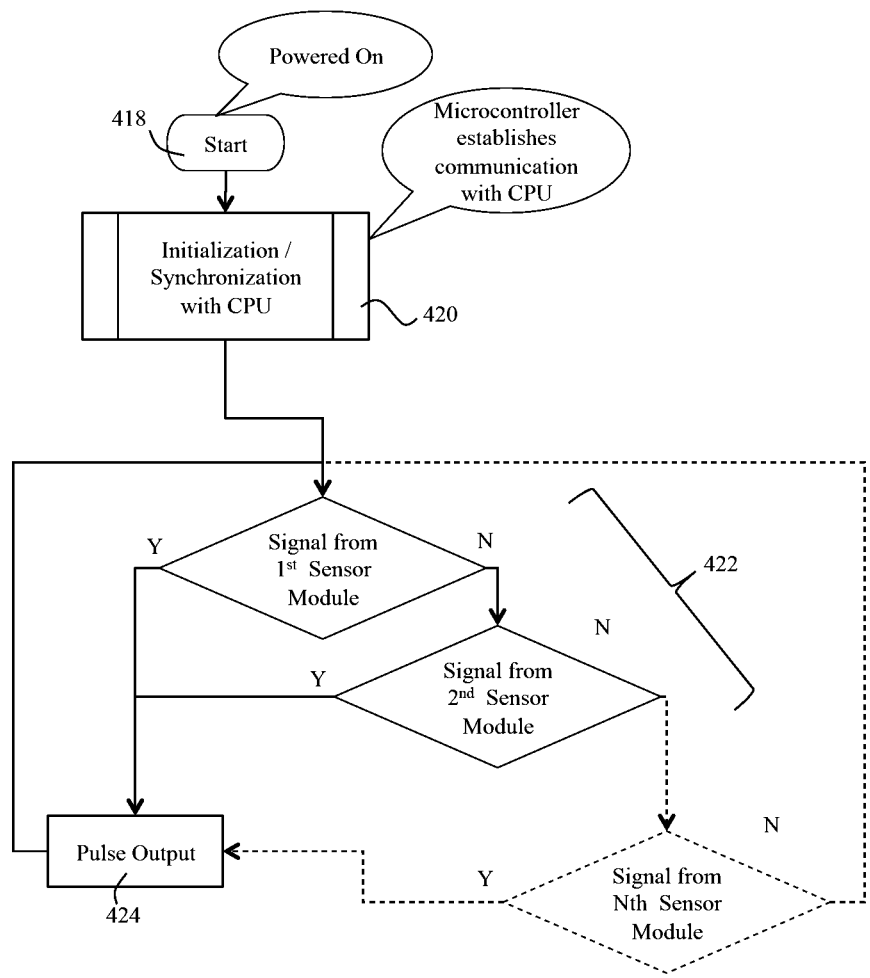

FIGS. 4A and 4B are non-limiting, exemplary implementation of a flow meter interface module of the flow management apparatus in accordance with one or more embodiments of the present invention. FIG. 4A is non-limiting, exemplary circuit topography, illustrating an exemplary implementation of a flow meter interface module 210 in accordance with one or more embodiments of the present invention. As indicated above, the type of flow meter interface module 210 used in accordance with one or more embodiments of the fluid management apparatus 100 depends on the type of flow indicator 202 being used. In this non-limiting, exemplary instance, flow indicator 202 includes one or more magnets 206 to generate variations in magnetic filed 208 as an indication or representation of fluid flow 204 (as shown in FIGS. 2A to 2C). Accordingly, flow meter interface module 210 therefore, is a magnetic field sensor 402 that is operatively coupled with flow indicator 202 to detect representations of indications of flow of fluid 204 by the flow indicator 202. That is, one or more magnetic field sensor units 402 may be used, with each unit 402 comprised of one or more hall-effect sensor modules 406 to detect magnetic field variations 208 generated by the flow indicator 202.

As further illustrated in FIG. 4A, flow meter interface module 210 also includes a microcontroller 408 that as detailed below, receives signals representing detected magnetic field 208 from one or more magnetic field sensor units 402 for processing and transmission to CPU 302 via a set of connectors 410. The hall-effect sensors modules 406 are comprised of one or more hall-effect sensors 412 that generate an analog signal indicative of a detected magnetic field 208, and a signal digitizer that digitizes the analog signal and outputs a digital signal to the microcontroller 408. In the non-limiting, exemplary instance illustrated, the signal digitizer may comprise of a comparator 414 that has an input that receives the analog signal from the hall-effect sensor 412, and an output that drives a transistor 416 to generate a digitized signal indicative of detected magnetic filed 208, which is output to microcontroller 408. Microcontroller 408 determines if the received digital signal from any one of the one or more sensors is correct representation of an indication of a flow (and not an error) through well-known error checking methods, and outputs a flow indicator signal to CPU 302. In other words, hall-effect sensors switch state and forward a logic level (high or low), with a final digital signal transmitted to the CPU 302.

FIG. 4B is a non-limiting, exemplary flowchart for receiving and processing of hall effect detected signals by the microcontroller 408 in accordance with one or more embodiments of the present invention. As illustrated, turning ON the fluid management apparatus 100 would activate and turn ON the microcontroller 408 at operation 418. Upon activation, microcontroller 408 commences initialization and synchronization processes with CPU 302 at operation 420. At operations 422, microcontroller 418 commences detection of pulses (or signals) from various hall effect sensors at which point, if a signal or a pulse is received from any one of the sensors, at operation 424 microcontroller 418 outputs a pulse (a digital signal representing detection of magnetic field by hall effect sensors) to CPU 302.

Figure 5A:
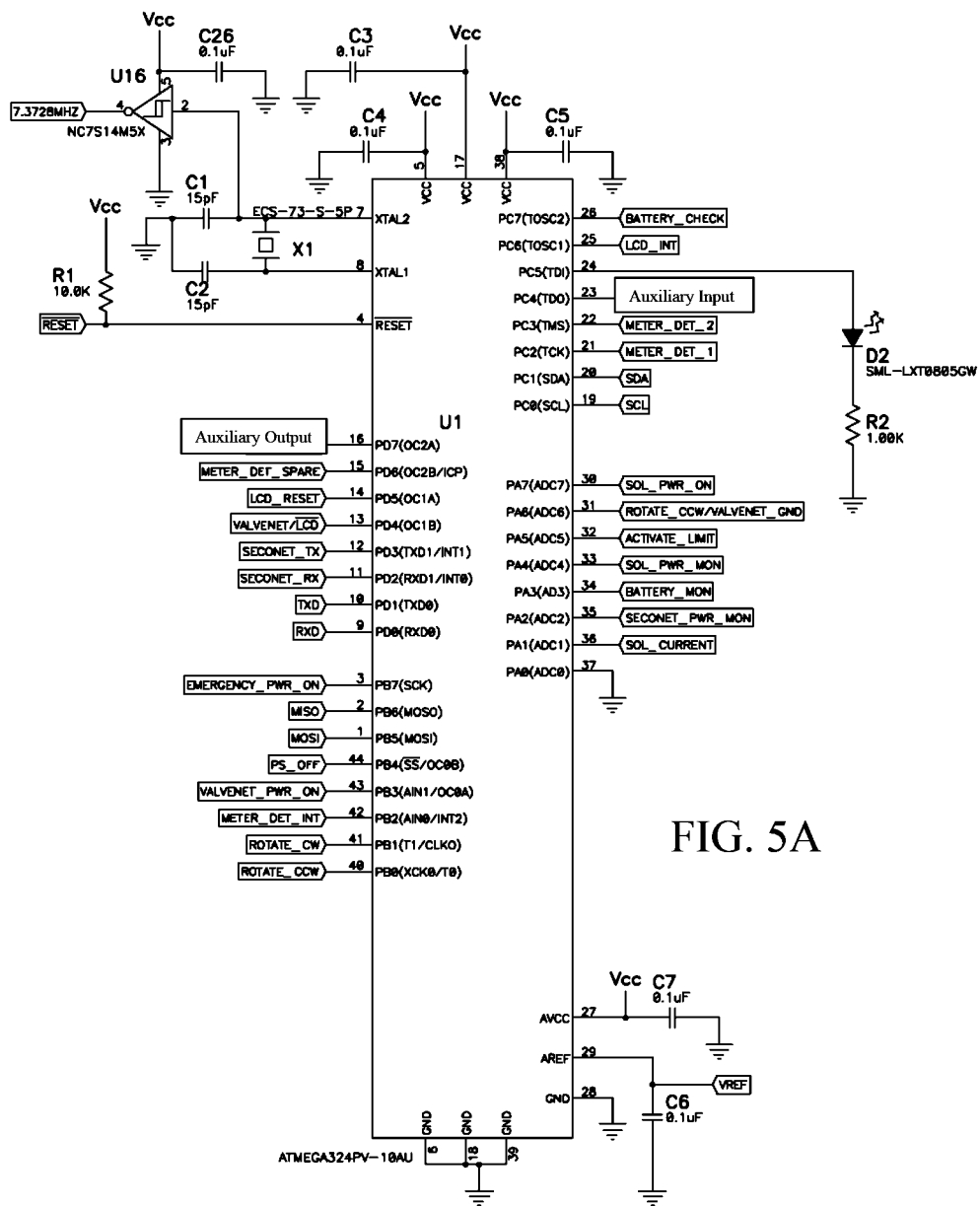
FIGS. 5A and 5B are non-limiting, exemplary circuit topographies that exemplary illustrate an implementation of CPU, memory/storage, clock, and CPU interface in accordance with one or more embodiments of the present invention.
Figure 5B:
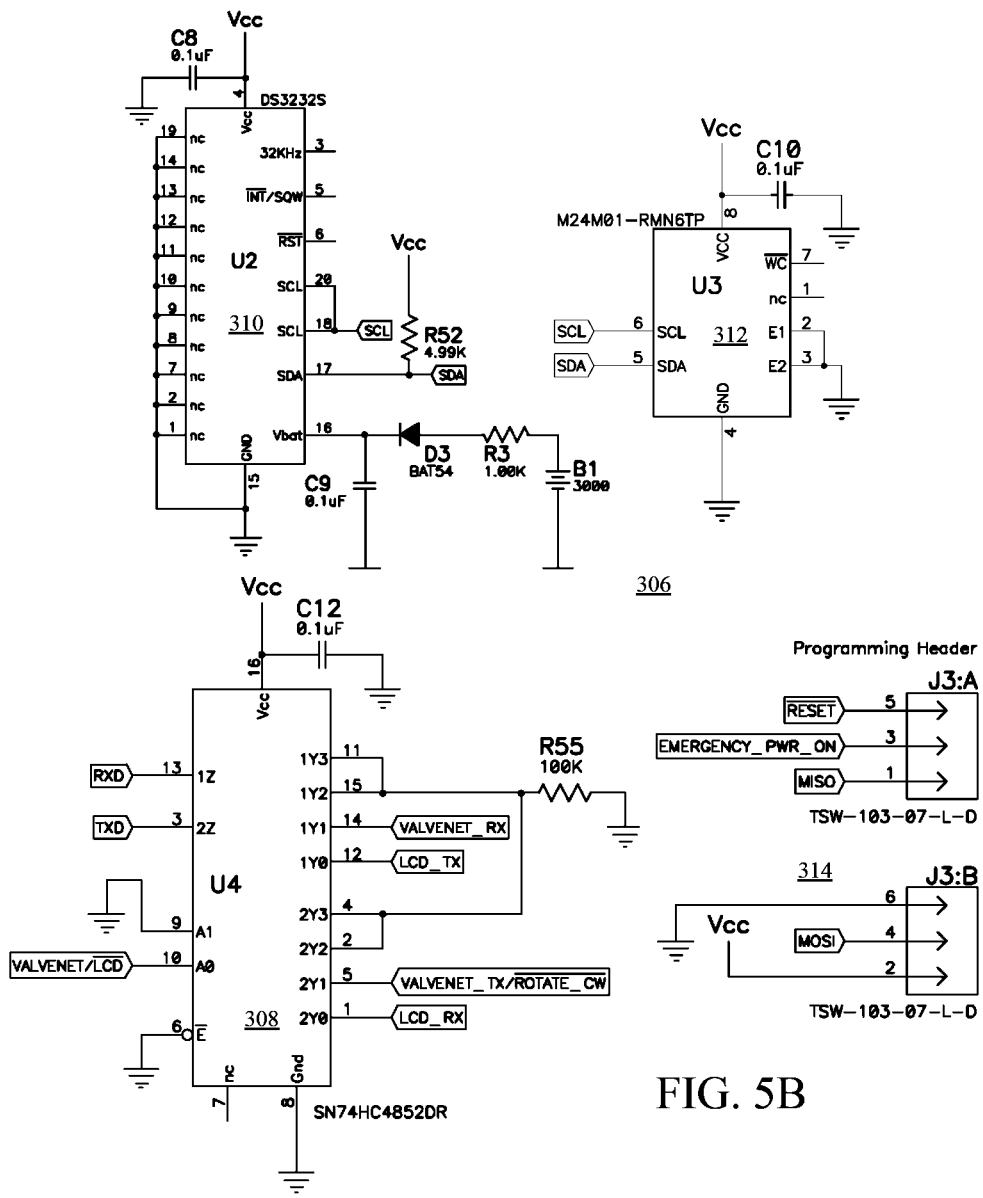

FIGS. 5A and 5B are non-limiting, exemplary circuit topographies that exemplary illustrate an implementation of CPU, memory/storage, clock, and CPU interface in accordance with one or more embodiments of the present invention. CPU 302 illustrated in FIG. 5A is a well-known Reduced Instructions Set Computing (RISC) device connected to a well-known supporting circuitry (memory/storage 310, clock 312, CPU interface 308, connectors 314, etc.) illustrated in FIG. 5B.

Figure 5C:
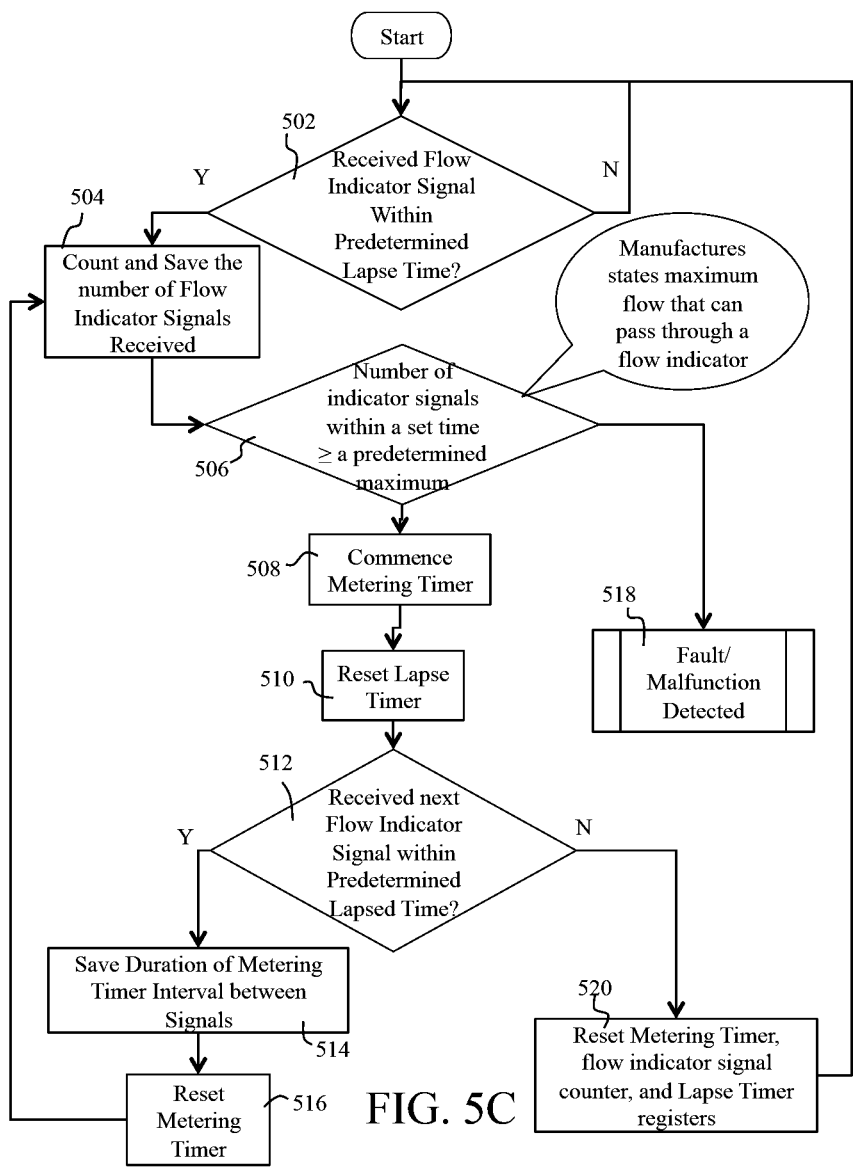
FIG. 5C is a non-limiting, exemplary flowchart for processing of sensed signals by CPU received from a microcontroller in accordance with one or more embodiments of the present invention.

FIG. 5C is a non-limiting, exemplary flowchart for processing of sensed signals 424 by CPU 302 received from microcontroller 408 in accordance with one or more embodiments of the present invention. As indicated above, upon detection of a magnetic field 208, microcontroller 408 outputs a pulse signal (a flow indicator signal) at pin 42 of CPU 302. As illustrated in FIG. 5C, at operation 502 CPU 302 determines if a flow indicator signal 424 is received within a predetermined lapse time at pin 42. If CPU 302 determines that the flow indicator signal 424 is received within the predetermined lapse time, CPU 302 commences a flow indicator signal counter at operation 504 that counts and stores a total number of flow indicator signals received. At operation 506 CPU 302 determines if the number of flow indicator signals received is greater than a predetermined maximum. If at operation 506 CPU 302 determines that the number of flow indicators signals 424 received is greater than a predetermined maximum, CPU 302 at operation 518 indicates a malfunction. In other words, if too many pulses 424 are received within a time period (which is derived from the specification of a flow indicator manufacturer), the CPU 302 communicates that information with end users since too many pulses 424 would mean that flow indicator is displacing more fluid than its capacity would allow, which would be impossible. The indication of too many pulses 424 may be used to alert end users that something physical may have failed (the flow indicator is spinning too fast). If at operation 506 CPU 302 determines that the number of flow indicators signals 424 received is not greater than a predetermined maximum, CPU 302 commences a metering timer T at operation 508, and resets and restarts the lapse timer at operation 510 until a next flow indicator signal 524 is received.

At operation 512 CPU 302 determines if a next flow indicator signal 424 is received within a predetermined lapse time at pin 42. If at operation 512 CPU 302 determines if a next flow indicator signal 424 is not received within a predetermined lapse time at pin 42 (e.g., user has simply shut-off water), CPU 302 resets metering timer, flow indicator signal counter, and the lapse timer registers at operation 520. If at operation 512 CPU 302 determines that next flow indicator signal 424 is received within a predetermined lapse time, CPU 302 saves the time interval T measured between the flow indicator signal 424 and the next flow indicator signal at operation 514, resets metering timer at operation 516, and increments total number of flow indicator signals received at operation 504.

Figure 5D:
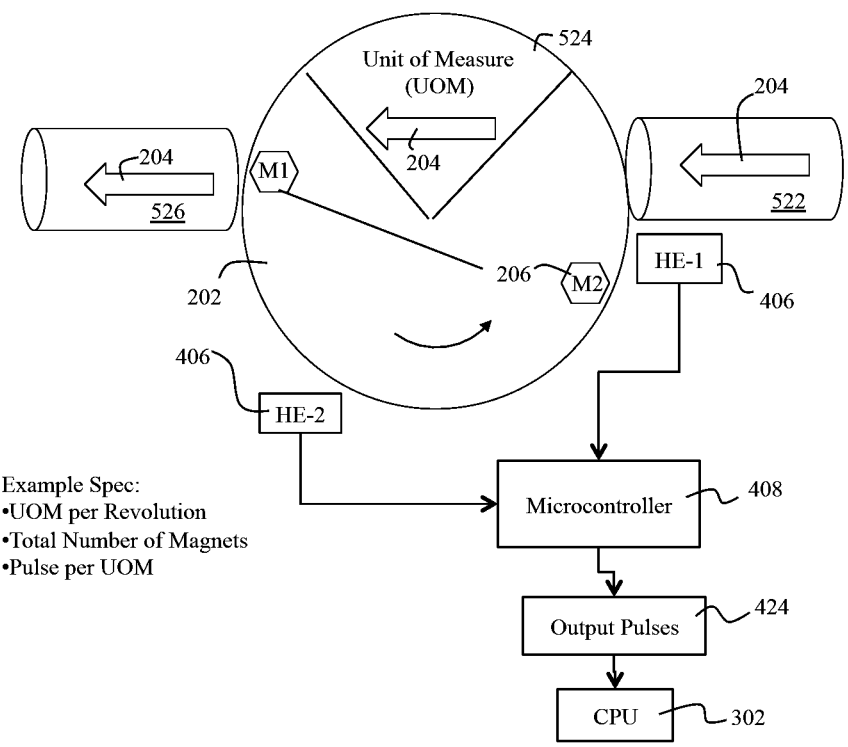
FIG. 5D is a non-limiting, exemplary simplified schematic systems view illustrations for determining flow characteristics in accordance with one or more embodiments of the present invention.
Figure 5D:
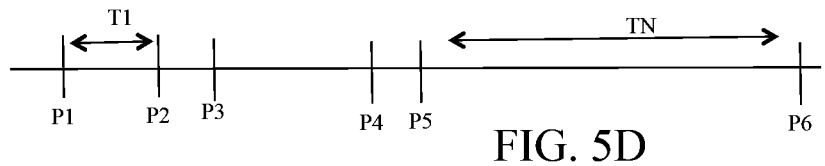

FIG. 5D is a non-limiting, exemplary simplified schematic systems view illustrations of determining flow characteristics in accordance with one or more embodiments of the present invention. CPU 302 determines a flow rate and other flow characteristics of a flow profile from the total number of flow indicator signals 424 and respective time intervals T determined using the operations disclosed in FIG. 5C. As the simplified schematics of FIG. 5D illustrates, in general, flow indicator 202 is comprised of a chamber 524 and in this non-limiting, exemplary instance, includes two magnets 206 (M1 and M2).

Flow indicators 202 are positive-displacement flow meters that accumulate a fixed volume of fluid and then account for the number of times the volume is filled by the magnetic field they generate to measure flow. Flow indicators include chamber 524 that can positively displace fixed volume of fluid 204 and further, indicator mechanism (such as magnets) 206 that generate a magnetic field 208 that is used in accordance with one or more embodiments of the present invention to ultimately generate flow indicator signals 424 (or pulses) received by CPU 302.

In general, flow indicator manufacturer provides specifications with respect to the size of chamber 524, the number of magnets used, and the maximum spin rate. In particular, the manufacturer specs may state the Unit Of Measure (UOM) of fluid displaced (positive displacement) per Revolution, and total number of magnets of the flow indicator 202. Non-limiting examples of UOM may be provided in gallons, liters, or some other unit. Accordingly, flow indicator 202 is a positive-displacement flow meter that accumulate a fixed volume of fluid 204 within chamber 524, and includes magnets that enable generation of pulses to enable to count the number of times chamber 524 is filled by the magnetic field generate by magnets, which enables measurement of flow rate. In other words, the manufacturer specs enable for the calculation of the number of pulses (signals) generated by the flow indicator 202 to finally determine flow rate (detailed below). As a non-limiting specific example, the specs from the manufacturer for the flow indicator 202 of FIG. 5D may indicate a 1-gallon per 50 revolutions, with two magnets. This would mean 100 pulses (signals generated by the two magnets M1 and M2) per gallon. However, as illustrated in FIG. 5D, the present invention uses two hall-effect sensor modules 406 and hence, a total of four (4) pulses would be generated per revolution of flow indicator 202. Accordingly, this would mean 200 pulses (signals generated by two magnets M1 and M2 and two hall-effect sensor modules 406) per gallon of fluid 204.

As illustrated in FIG. 5D, fluid 204 flows through an ingress pipe 522 coupled to the flow indicator 202, and is accumulated within chamber 524. Once filled, the continued flow of fluid 204 forces a rotation of the flow indicator 202 to allow the chamber 524 to rotate towards an egress pipe 526 and "dump" the accumulated fluid 204 from chamber 524 into an egress pipe 526. As the flow indicator 202 rotates, the coupled magnets M1 and M2 also rotate and pass the two hall-effect sensor modules 406, generating 4 pulses (flow indicator signals) per revolution of the flow indicator 202, providing the following:

$$\frac{4 \times \text{Pulse}}{UOM}$$

Accordingly, motion is detected by hall-sensors 406 by detection of variations in magnetic field 208 caused by motion of magnets M1 and M2, which is output as flow indicator signals (pulses) 424 by the microcontroller 408 to CPU 302. The following is a non-limiting example of a determining flow rate in accordance with processing flow of FIG. 5C, with the illustrated time chart of FIG. 5D.

Example 1

Manufacturer Spec:
UOM per Revolution: 0.02 gallons per revolution; (or 50 Revolutions/gallon)
Number of Magnets: 2
During normal operations and with reference to FIG. 5C, once a flow indicator signal 424 is received at pin 42 of CPU 302 within an elapsed time at operation 502, at operation 504 a pulse counter counts and saves the number of flow indicator signals 424 received. In this non-limiting exemplary instance, the first flow indicator signal is pulse "P1" (FIG. 5D). At operation 508 CPU 302 commences a metering timer T1 (FIG. 5D) until a next flow indicator signal is received, which is pulse "P2" (FIG. 5D). CPU 302 may then determine the instantaneous flow rate between pulses P1 and P2. Assuming T1=0.5 sec:

$$\frac{1 \text{ gallon}}{200 \text{ pulses}} \times \frac{2 \text{ Pulses } (P1 \text{ and } P2)}{0.5 \text{ sec}} =$$

$$0.02 \text{ gallons/sec.} = 1.2 \text{ gallons/min flow rate.}$$

This would mean that between Pulse 1 and Pulse P2 with duration of 0.5 sec, a flow rate of 1.2 gallons/minute is metered. If another pulse (P3) is received at operation 512, where time T2 between P2 and P3 is T=0.40 sec, CPU 302 would determine the flow rate as follows:

$$\frac{1 \text{ gallon}}{200 \text{ pulses}} \times \frac{3 \text{ Pulses } (P1, P2, \text{ and } P3)}{0.5 \text{ sec} + .40 \text{ sec}} \approx$$

$$0.017 \text{ gallons/sec} \approx 1 \text{ gallon/min.}$$

Figure 6A:
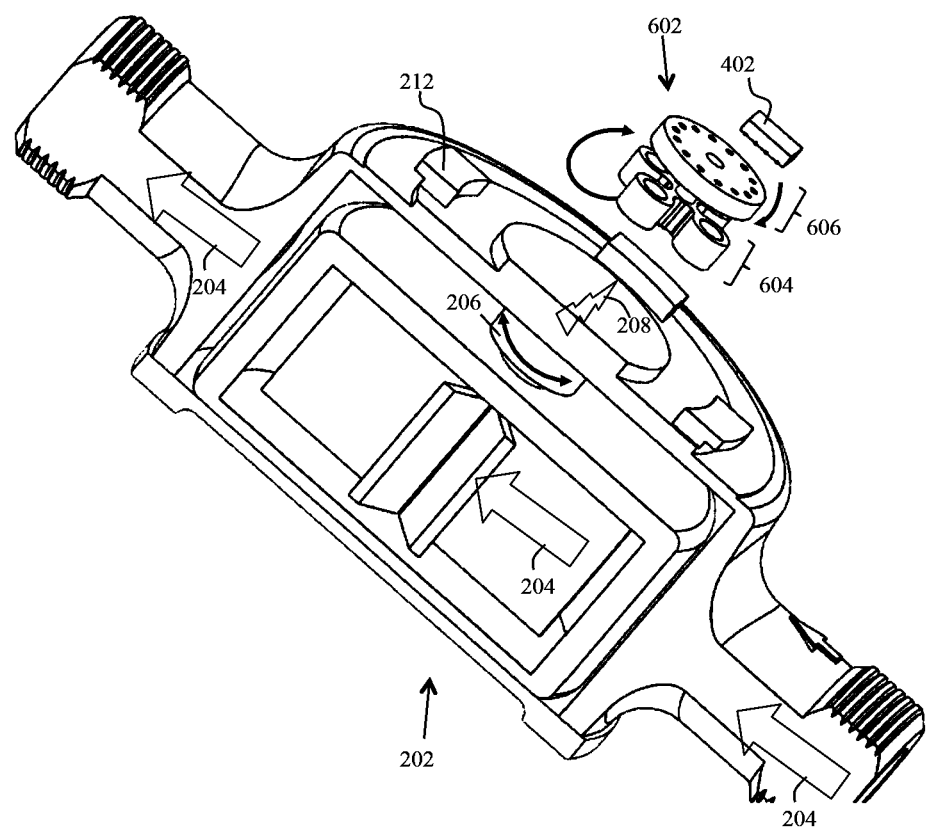
FIGS. 6A and 6B are non-limiting, exemplary illustrations of an indicator amplifier in accordance with one or more embodiments of the present invention.
Figure 6B:
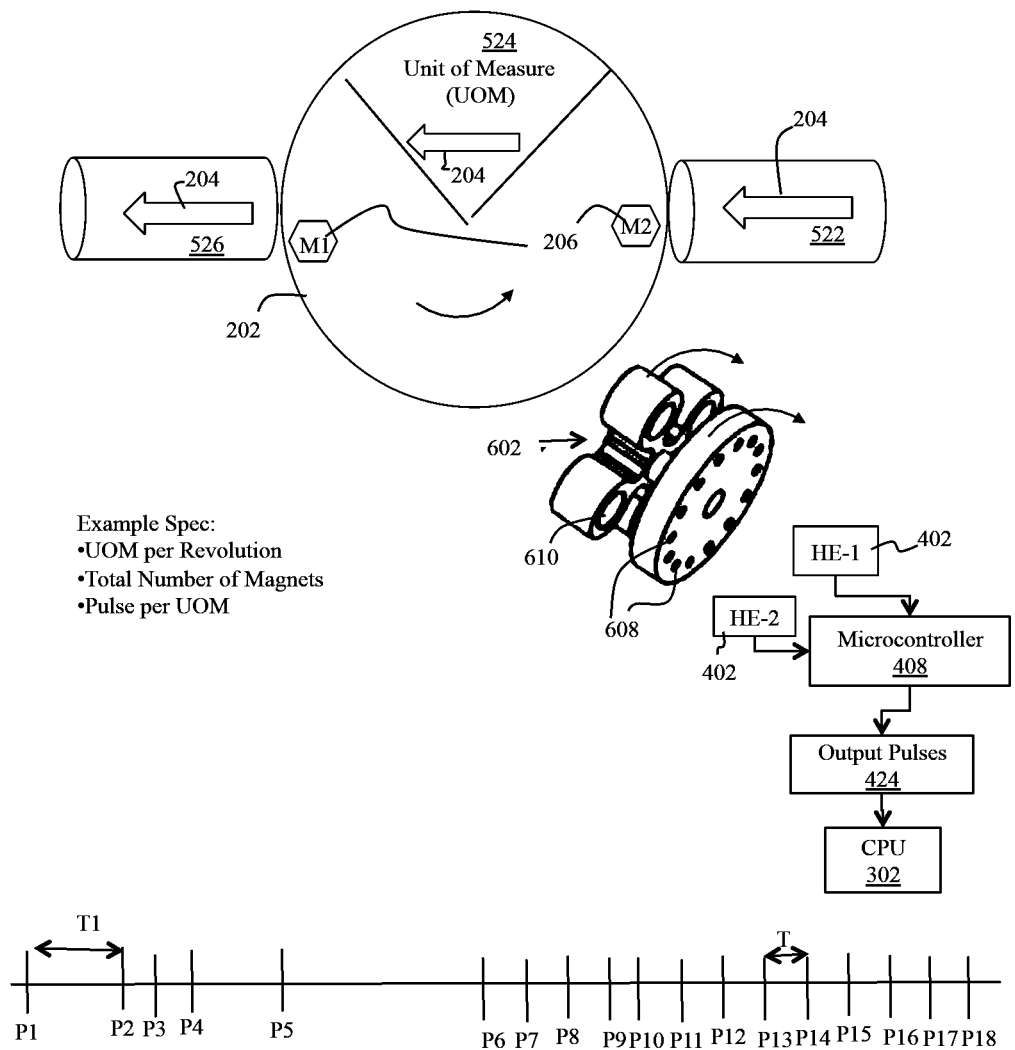

FIGS. 6A and 6B are non-limiting, exemplary illustrations of an indicator amplifier in accordance with one or more embodiments of the present invention. As indicated above, the higher the number of pulses the more granulated and more precise the final flow rate calculations. Unfortunately, most flow indicators 202 are manufactured with a fixed, limited number of magnets (usually one or two) and hence, to improve the "resolution" of the actual amount of fluid flowing through the flow indicator 202, a higher number of sensors may be used. However, the use of higher number of sensors increases the complexity of the overall circuitry and further, increases the consumption of electric power. Accordingly, as illustrated in FIGS. 4A, and 6A and 6B, one or more embodiment of fluid management apparatus 100 may optionally comprise of flow indication amplifier (or multiplier) 602 positioned between fluid indicator 202 and sensor modules 402 for improved metering of an indication of flow without modifying a conventional flow indicator 202 and further, without the use of additional electronic sensors.

Indication amplifier 602 includes a first part 604 that is operatively associated with and moves under an influence of a first external device, and a second part 606 that moves as a result of the movement of the first part 604. Second part 606 has a number of marker members 608 that enable a second external device to measure the movement of the second part 606 at a frequency commensurate with the number of maker members 608. This way, a movement of the first part 604 (under the influence of the first external device) is amplified into higher resolution of motion (i.e., higher number of pulse per revolution) affected by the number of the marker members 608 of the second part 608.

It should be noted that just as the type of flow metering interface module 210 used depends on the type of indication used by the fluid indicator 202 (e.g., magnetic based), the indication amplifier 602 may also be varied according to the means by which flow is indicated. In this non-limiting, exemplary instance, since both flow indicator 202 (as the first external device) and the flow meter interface module 210 (as the second external device) are magnetic based, the indication amplifier 602 is also magnetic based. Accordingly, indication amplifier includes a first part 604 that houses magnets 610 that are operatively associated with and moves under an influence of the magnets M1 and M2 of flow indicator 202. Second part 606 moves as a result of the movement of the first part 604, with the second part having a number of marker members comprised of magnets 608 that enable the sensor module 402 to measure the movement of the second part 606 at a frequency commensurate with the number of maker members 608. This way, a movement of the first part 604 (which is magnetically locked with magnets 206) is amplified into higher resolution of motion affected by the motion of the number of the marker members 608 of the second part 606. For example, a very small movement of the first part 604 may be translated into several pulses due to movement of marker members 608.

Accordingly, an indication of flow is multiplied to a higher resolution to thereby allow indication of flow of very low flow levels (e.g., leaks) that would not have been possible otherwise. In other words, the flow may be so low that the flow indicator 202 barely generates an indication of flow (e.g., a variation in the magnetic field) due to small leakage. The very low indication of flow (e.g., low levels of variations in the magnetic field 208) may not be sufficient or have sufficient strength or even duration to allow the flow meter interface module 210 (e.g., a hall effect sensor 406) to register the existence of a flow. In that case, the use of indication amplifier 206 would magnify the slight (un-register-able) indications of flow (e.g., variations in magnetic field 208) to a much higher resolution to enable the flow meter interface module to register a very low flow event (e.g., a small leakage). The following is a non-limiting example of determining flow rate in accordance with processing flow of FIG. 5C, with the illustrated time chart of FIG. 6B using the indicator amplifier 602.

Example 2

Manufacturer Spec:
UOM per Revolution: 0.02 gallons per revolution; (or 50 Revolutions/gallon)
Number of Magnets: 2
Assuming that the indicator amplifier includes six marker members (six magnets) 608, total number of pulses generated would be 12 pulses per revolution or alternatively:

$$\frac{12 \times 50 \text{ Pulses}}{\text{gallon}} = \frac{600 \text{ Pulses}}{\text{gallon}}$$

During normal operations and with reference to FIG. 5C, once a flow indicator signal 424 is received at pin 42 of CPU 302 within an elapsed time at operation 502, at operation 504 a pulse counter counts and saves the number of flow indicator signals received. In this non-limiting exemplary instance, first flow indicator signal 424 is pulse "P1" (FIG. 6B). At operation 508 CPU 302 commences a metering timer T1 (FIG. 6B) until a next flow indicator signal is received, which is pulse "P2" (FIG. 6B). CPU 302 then determines the instantaneous flow rate between pulses P1 and P2. Assuming T1=0.5 sec:

$$\frac{1 \text{ gallon}}{600 \text{ pulses}} \times \frac{2 \text{ Pulses}(P1 \text{ and } P2)}{0.5 \text{ sec}} =$$

$$0.0067 \text{ gallons per sec.} = 0.4 \text{ gallon/min.}$$

Any number of combinations and permutations of marker indicators (e.g., magnets) and or sensor modules (e.g., Hall-effect sensors) may be used so long as magnetic field interferences are accounted for in the design and calculations. It should be noted that obviously, the time interval between pulses P1, P2, ... PN may vary depending on many factors such as leakage, free flow of fluid, obstructed flow, etc. For example, if there is a leakage, the time interval between a first pulse P1 and the next pulse P2 will be longer. In other words, it would take longer time to fill the chamber 524 of the flow indicator 202 from the leaking fluid to then allow the flow indicator 202 to move to generate the next pulse. That time interval T between the first pulse and next pulse due to leakage will therefore, be used to determine if there is a leakage. If the number of makers 608 is increased, then even smaller travel or motions may be sensed to detect even a smaller and a very low leakage.

As indicated above, fluid management apparatus 100 further includes a well-known and conventional power management module 304, a non-limiting, exemplary implementation of which is illustrated in FIG. 7 that provides networking power to fluid management apparatus 100. Non-limiting example of a networking power may comprise of voltages greater than 5 volts, for example, 12 volts power.

Figure 8A:
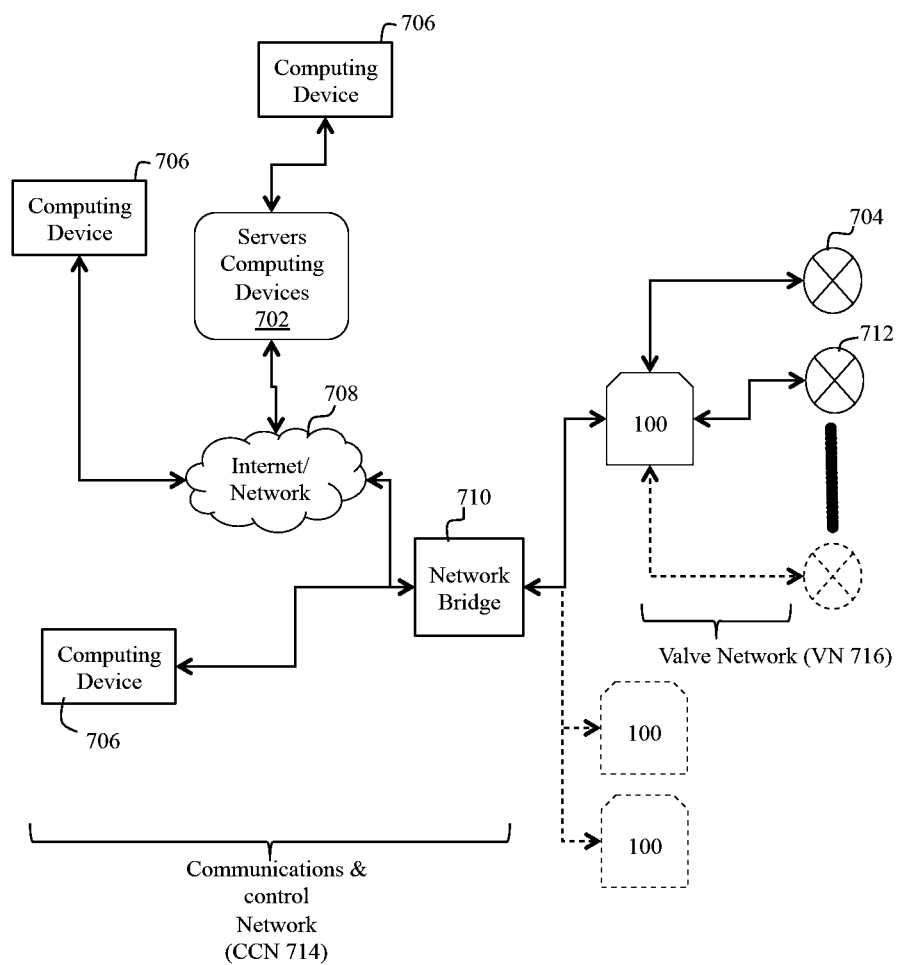
FIG. 8A is a non-limiting, exemplary illustration of a general overview of non-limiting, exemplary system architecture for implementing one or more embodiments of the present invention.
Figure 8B:
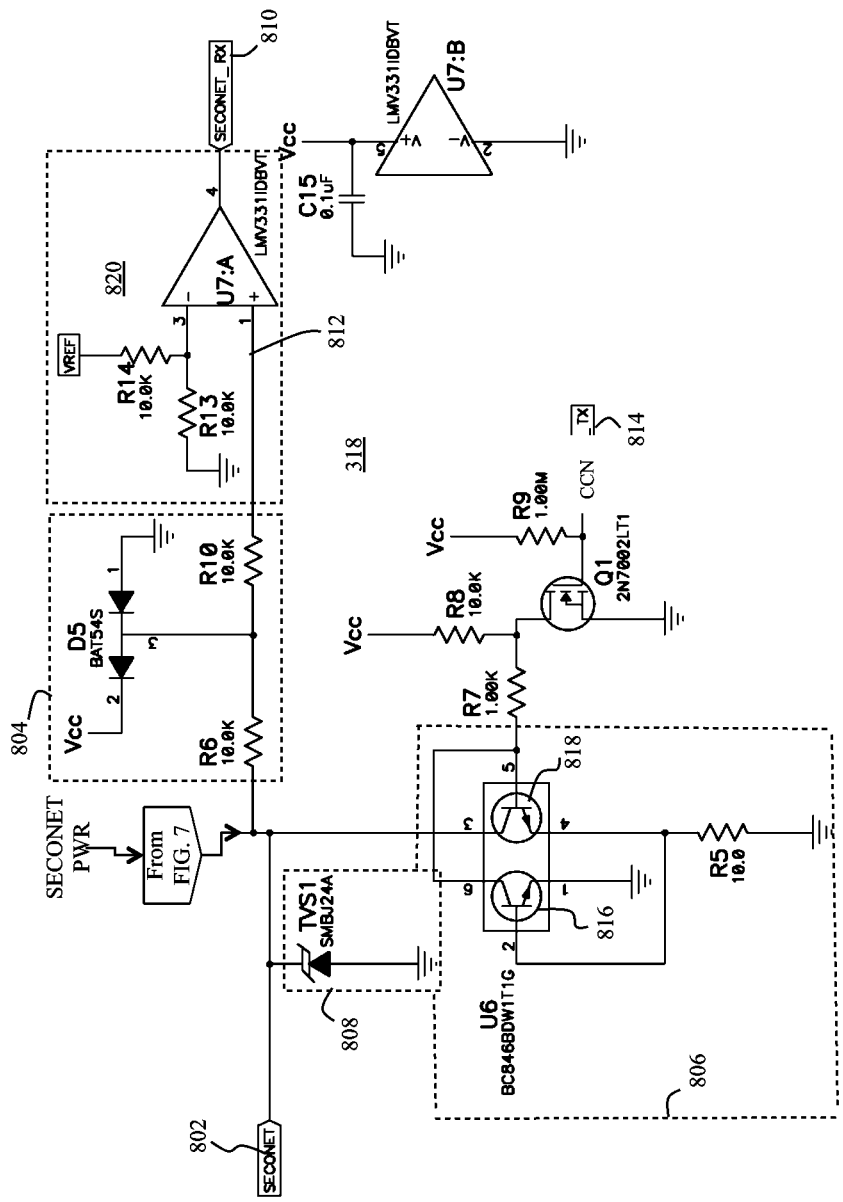
FIG. 8B is a non-limiting, exemplary hardware implementation of a network interface module in accordance with one or more embodiments of the present invention.

FIG. 8A is a non-limiting, exemplary illustration of a general overview of non-limiting, exemplary system architecture for implementing one or more embodiments of the present invention. As indicated above, fluid management apparatus 100 is a network-enabled device. This means that one or more fluid management apparatus 100 may be networked with other networked devices, including other fluid management apparatuses 100 through a Communications and Control Network (CCN) 714 and further, one or more fluid management apparatus 100 may be connected with a valve 704 or networked with one or more valve modules 712 via a valve network (VN) 716.

As illustrated, a non-limiting, exemplary method of implementing a networking system architecture for CCN 714 is to provide one or more well-known Internet enabled computing devices (e.g., laptop, mobile devices, etc.) 706 that may be networked with one or more well-known servers 702 that may communicate with one or more fluid management apparatus 100 via Internet/Network 708 through a well-known Network Bridge 710. As further illustrated, computing device 706 may also be coupled with one or more fluid management apparatus 100 either directly through Network Bridge 710 or via Internet/Network 708 and network bridge 710.

Server computing devices 702 and computing devices 706 are well known devices extensively used for network communications. Network/Internet 104 may be any one of a number of conventional, well-known network systems that may include functionalities for packaging data in well-known methodologies into one or more formats (of one or more packets) suitable for communications between networked devices. A Network Bridge is also a well-known network device (for example, a "translator") that enables connection of multiple network segments.

It should be noted that any one of the one or more embodiments of the present invention may be implemented in other well known types of system architecture (or processing environments capable of supporting the methodologies of the various embodiments of the present invention) such as, for example, peer-to-peer architecture, client/server, hybrid of both, etc. Client/server, peer-to-peer, or hybrid combination environments, database and or application servers, and networks or networking in general, including a large variety of protocols used for communication and control, translations of signals, and so on are very well documented in various technical, trade, and patent literature. Further, any one of the one or more embodiments of the present invention may also be implemented as a standalone device.

FIG. 8B is a non-limiting, exemplary hardware implementation of a network interface module 318 in accordance with one or more embodiments of the present invention that enable fluid management apparatus to be a network enabled device. As illustrated, network interface module 318 receives power from the power management module 304. As indicated above, network interface module 318 illustrated in FIG. 8B enables fluid management apparatus 100 to network with one or more external devices, non-limiting, non-exhaustive listing of examples of which may include other fluid management apparatuses 100, an Internet enabled networking devices (e.g., a computer modem), mobile computing devices, displays, etc.

Network interface module 318 enables modification of operations of fluid management apparatus 100 by an external device and equally, enables any data from fluid management apparatus 100 to be retrieved and used by the external device. For example, fluid management apparatus 100 may be reprogrammed with additional profiles (detailed below) using network interface module 318. As another example, data gathered from various operations of fluid management apparatus 100 over a period of time may be retrieved using network interface module 318. As a specific example, an external device with the implemented network interface 318 may request data related to flow rate, device ID (which would also indicate fluid management apparatus location), etc. which may be retrieved from wired connections between network interface module 318 of the external device and that of fluid management apparatus 100. For example, CPU 302 may transmit information requested by the external device, which may include any parameter or information saved and stored within the storage module 310 of the fluid management apparatus 100, non-limiting, non-exhaustive listing of examples of which may include, flow rate, volume, system errors, alarms, etc. For example, if an alarm is triggered (detailed below), an alarm signal is transmitted via pin 12 of CPU 302 to an externally connected device.

As best illustrated in FIG. 8B, network interface module 318 is a two-wire bi-directional communications module that uses Ground 336 (FIG. 3B) and a single wire (I/O port) 802 for exchange of network-based data. Accordingly, network interface module 318 enables external devices to transmit and receive network data to and from fluid management apparatus 100 through wired network (FIG. 8A) using firmware drivers.

Firmware drivers for the interface module 318 may be developed in well known methodologies by and for any third party platform, similar to well known firmware drivers such as RS 422 drivers that are developed for various computing platforms, which provide the proper protocol for proper "translation" of signals communicated between wire connected devices. It should be noted that if need be, interface module 318 itself may be implemented using RS 422 and in fact, even third party firmware drivers may also be modified in well known methodologies to operate with network interface module 318.

Networking interface module 318 of the present invention is advantageous over known communications protocols (e.g., Universal Serial Bus (or USB), RS 232, etc.) in that networking interface module 318 operates at a low frequency of about 9600 Hz over long distances (e.g., 3000 feet cables), and has a very simple wiring scheme, which leads to lower costs in terms of manufacturing and design.

Fluid management apparatus 100 is designed to communicate with external devices at long distances (e.g., 3000 feet) and further, most types of devices with which fluid management apparatus 100 communicates (e.g., valves, various electromechanical sensors, etc.) also operate at very low frequency. Accordingly, network interface module 318 provides a bi-directional communications scheme that enables serial communications or exchange of data at a low frequency or rate over long distances (e.g., 3000 feet) and at a high voltage level (e.g., 12 V+) using a single wire for communications and exchange of data without the complexities associated with RS 422, RS 232, or USB connectivity. It should be emphasized that FIG. 8 is only a non-limiting, exemplary implementation of network interface module 318 and therefore, should not be limiting. Accordingly, other circuit topographies and schemes are possible so long as serial communications between wire connected devices is enabled over long distance, at low frequency, at high voltage levels, and further, with simple circuit topography that also provides protection schemes as detailed below.

Network interface module 318 communicates through a two-wire bidirectional communications scheme using terminal set 330 of connectivity port 830, with data signal values having voltages between Ground terminal 336 and I/O network terminal 802. The power terminal 326 of terminal set 330 is not required for exchange of network data signals but may optionally be used to supply power to an external connected device (if need be).

As detailed below, network interface module 318 is comprised of signal conditioning as well as protection circuits. Signal conditioning circuits of network interface module 318 provide compatibility between systems that operate at different voltage levels and further introduce efficiencies in terms of power usage. That is, signal conditioning circuits of network interface module 318 enable high voltage levels from network bus (at terminal 802) to be conditioned to lower voltage levels to be used by CPU 302 and further, enable data signals from CPU 302 (which are a low voltage levels) to be conditioned to high voltage levels for transmission of data signals on the network bus (at terminal 802). Non-limiting example of a high voltage level may for example, be a voltage level above those used by CPU 302 (e.g., greater than 3 to 5 volts, for example, 12 volts) and non-limiting example of a low voltage level may for example, be a voltage level used by CPU 302, e.g. 3 to 5 volts. As further detailed below, when idle (no data exchange between devices) network operating interface module 318 operates at low power. As to voltage protection circuits, as detailed below, they are provided to protect circuitry and various other components of fluid management apparatus 100.

Network interface module 318 includes a network receiver input terminal 810, signals of which are input (or are received) by pin 11 of CPU 302. During receipt of network data from one or more external devices, network data signals via I/O network terminal 802 (also shown as pin or terminal 2 of terminal set 330 of connection port 830 shown in FIG. 3B) is transmitted through input conditioning circuit 820 where high voltage levels (e.g., about 12V+) from I/O network terminal 802 are conditioned to operating voltage levels (e.g., 3 to 5 volts) of CPU 302 network receiver input terminal 810.

Network data signals via I/O network terminal 802 are received via input line 812 and terminal 1 of comparator U7, with the input line 812 to comparator U7 protected by the thyristor 808 and first current limiter 804. Comparator U7 in combination with voltage divider scheme comprised of resistors R13 and R14 enable high voltage levels (e.g., about 12V+) from I/O network terminal 802 to be conditioned to operating voltage levels (e.g., 3 to 5 volts) of CPU 302 at network input terminal 810. Accordingly, high voltage levels on I/O network terminal 802 are conditioned to operating voltage levels appropriate for CPU 302 by the network interface module 318.

As further illustrated, network interface module 318 also includes a transmitter output terminal 814 (coupled to a built-in UART of CPU 302), signals of which are output from pin 12 of CPU 302. Transmitter output terminal 814 is connected to the UART of CPU 302 and hence, when idle, is pulled to Vcc via resistor R9. Accordingly, output values at transmitter output terminal 814 must be inverted when transmitter output terminal 814 is no longer idle and becomes active for transmission of data signals (a well known scheme used when handling output from UART). Therefore, during transmission of actual data signals to a wire-connected external device, the voltages representing the data signals from CPU 302 are inverted via MOSFET transistor Q1.

Accordingly, an active high data signal (a voltage level from CPU 302) at the base of Q1 maintains Q1 biased ON and hence, pulling Vcc to ground via resistor R8, generating a zero volts value at junction of R8/R7 and hence, the base terminal 5 of transistor 818. This biases OFF transistor 818, enabling I/O network terminal 802 connected to collector terminal 3 of transistor 818 to float at network bus level voltages. Accordingly, a high logic level (e.g., 3 to 5 Volts) from CPU 302 is conditioned to a voltage level between Ground and network bus voltage level at I/O network terminal 802 (for example, 12V).

On the other hand, an active low (voltage level at Ground) of data signal from CPU 302 at the base of Q1 will bias Q1 OFF and hence, driving the base terminal 5 of transistor 818 to bias ON via Vcc, R8, and R7, which, in turn, pulls the collector terminal 3 to Ground, resulting in a zero volt at I/O network terminal 802.

Accordingly, transistor 818 (functioning as an output conditioning circuit of network interface module 318) enables voltage levels from CPU to be conditioned to network bus operating voltage levels at I/O network terminal 802. As a non-limiting example, a high logic level from CPU 302 at transmitting output terminal 814 may have a voltage value of 3.3 V to 5 V, which would be translated to operating voltage level at I/O network terminal 802 (for example, 12 V) via transistor 818. Accordingly, CPU 302 output voltage signals via transmitter output terminal 814 are conditioned to operate on I/O network terminal 802 for appropriate network communications between devices.

Due to the use of fairly high voltage levels of approximately 12 volts and above to transmit and receive data at long distances (e.g., 3000 feet) where communications lines may be buried underground, one or more embodiments of the present invention provide the networking interface module 318 with circuit protection schemes 804, 806, and 808 that protect fluid management apparatus 100 (and in particular, CPU 302) against potential over current or over voltage issues related to transmission lines. For example, first protection scheme 804 is comprised of a diode pair D5 and series coupled resistors R6 and R10 that insure voltage signal levels input to comparator U7 to remain below Vcc and above Ground. As another example, second protection scheme 806 is comprised of a current limiter U6 implemented as NPN BJT 816, NPN BJT 818, and resistor R5 to limit the current input from an external device for protection against over-current. Third protection scheme 808 uses a thyrestor that protects fluid management apparatus 100 against potential static electricity, lighting strikes, or power surges that are above the parameters set forth by the thyrestor used, which, in this non-limiting, exemplary instance is above 25 Volts and below ground.

FIG. 9 is a non-limiting, exemplary implementation of a switching interface module in accordance with one or more embodiments of the present invention. As illustrated and detailed below, switching interface module 320 enables connection of external switching devices to fluid management apparatus 100 (via exemplary terminal set 332 of connectivity port 830, best illustrated in FIG. 3B). Non-limiting, non-exhaustive, listing of examples of switching devices may include, for example, LED, relay, transducer, level sensor, pressure sensor, a moisture sensor, or other similar devices that can switch states based on one or more parameters.

Switch interface module 320 is associated with terminal set 332 of connectivity port 830 via the illustrated connector J4 and more particularly, data signal input/output (I/O) terminal 902 (pin #5) of terminal set 332 of connectivity port 830 for transmission and receipt of switching signals. Switch interface module 320 may transmit and or receive switching signals related to switch state conditions via data signal I/O terminal 902 of terminal set 332 when pins 1 and 2 of connector J4 are coupled together (for example, by a jumper).

Connecting pins 1 and 2 of connector J4 enable a switching signal of an external switching device such as a fluid level sensor or a relay switch to be input to CPU 302 via auxiliary output terminal 904 of comparator U17. For example, a level sensor may change switching states from an ON to OFF (for example, fluid has reached a predetermined level). In that case, the OFF signal is transmitted to CPU 302 through terminal 902 of terminal set 332, with the OFF signal passed onto the comparator U17 of the input conditioning circuit 820 through connector J4 (via jumper connecting pin 2 to pin 1). Thereafter, CPU 302 based on a predetermined set of parameters may in turn shut-off a valve to stop flow of fluid. As detailed below in relation to FIGS. 10A to 10C, CPU 302 may send out a valve shut-off signal to an externally connected valve via terminal set 334 of connectivity port 830 (e.g., terminals 906 and 908).

As further illustrated in FIG. 9, switching interface module 320 is further capable of allowing CPU 302 to transmit a switching state signal to an externally connected switching device via auxiliary output terminal 910. This would activate/deactivate (e.g., switch ON/OFF) the externally connected switching device, with the switching signal from CPU 302 input to the external device via connector J4 (via jumper connecting pins 1 to 2) and Input/Output terminal 902 of connectivity port 830. In this non-limiting, exemplary instance, auxiliary output terminal 910 is not connected to CPU 302 UART and hence, no requirement to invert its value. Therefore, a high value on terminal 910 would bias ON transistor 818, which would place a voltage Vcc on terminal pins 1 to 2 of connector J4, and from pin 2 of connector J4 to the I/O terminal 902 of connectivity port 830, which has connected to it a switching device. This would enable auxiliary output terminal 902 of port 830 to output a voltage Vcc to change a switching state of the connected switching device.

As further illustrated, connectivity between switch interface module 320 and terminal set 332 of connectivity port 830 is severed if a jumper is used to connect pins 2 and 3 of connector J4 together, with pin 3 connected to I/O network terminal 802 (i.e., the network interface module 318). In other words, terminal set 332 of connectivity port 830 is released from connection with switch interface module 320 when pins 2 and 3 of connector J4 are connected together by a jumper.

Connecting pins 2 and 3 of connector J4 connects the terminal set 332 of connectivity port 830 to the network interface module 318. In particular, since connector J4 is associated with terminal set 332 of connectivity port 830, input/output (I/O) terminal 902 (pin #5) of terminal set 332 of connectivity port 830 is enabled for transmission and receipt of network data (e.g., serial based data signals) when pins 2 and 3 are connected. In other words, terminal set 332 and data signal I/O terminal 902 (pin #5) of connectivity port 830 in particular, behave exactly the same as terminal 802 (pin #2) of terminal set 330 of connectivity port 830 when pins 2 and 3 of connector J4 are connected together. Stated otherwise, network data signals appearing on terminal 802 will be exactly the same as network data signals on terminal 902. Therefore, pin 2 of the connector J4 (depending on its association with either pin 1 or pin 3 of connector J4) may behave as a state change terminal for transmission/receipt of switch state condition from a switching device or, alternatively, may behave as a network terminal for transmission/receipt of serial data from a networked device. Therefore, use of a jumper to connect pins 2 and 3 of connector J4 enables state switch I/O terminal 902 (pin #5) of terminal set 332 of connectivity port 830 to operate as a network I/O terminal 902 instead, while isolating the rest of the switching interface module 320.

An important reason for using a jumper with connector J4 to modify the behavior of data signal input/output (I/O) terminal 902 (pin #5) of terminal set 332 of connectivity port 830 to function as either a state switch I/O terminal 902 or, alternatively, as a network I/O terminal 902 is to provide an additional network I/O terminal in a compact form-factor without adding a physically new terminal set to connectivity port 830. In other words, modification of the behavior of terminal set 332 of connectivity port 830 provides dual functionality desired, but without the addition of new physical terminal set. It should be noted that if size and space were not of issue, additional terminal sets may be added, which would eliminate the need for a jumper configured connector J4 or behavior modification of terminal set 332.

Therefore, fluid management apparatus 100 may have both a state switch connectivity with an externally connected switching device and simultaneously be networked with networking devices if pins 1 and 2 of connector J4 are connected together. However, if pins 2 and 3 of connector J4 are connected together, fluid management apparatus 100 may be used similar to a "daisy-chain" networking connector to enable a first networking device to communicate with a second networking device via connectivity port 830 of fluid management apparent 100. For example, fluid management apparatus 100 may receive network data on I/O terminal 802 of connectivity port 830 from a first network device that is connected to I/O terminal 802, and a second network device connected to I/O terminal 902 of connectivity port 830 would then receive the same network data that is on terminal 802 from fluid management apparatus 100.

The circuit protection schemes 804, 806, and 808 and input and output conditioning circuits of the switching interface module 320 have identical circuit topography and function (but may have different values) as those illustrated and discussed in detail in relation to network interface module 318.

FIGS. 10A and 10B are a non-limiting, exemplary implementation of a valve driver module in accordance with one or more embodiments of the present invention. As illustrated, valve driver module 322 is comprised of a well-known H-bridge valve driver (FIG. 10A) to activate and or deactivate valve 704 connected to fluid management apparatus 100, and a well-known DC to DC converter power supply (FIG. 10B) to power valves 704. Accordingly, valve 704 used need not include its own valve driver module and power supply.

As detailed in FIG. 10A, valve driver module 322 is comprised of a conventional H-bridge driver circuit that enables a single valve 704 with no valve driver or power circuitry to be actuated (e.g., clockwise CW or counter-clockwise CCW) by driving or biasing the appropriate transistors Q6, Q5, Q11, and Q12 of the H-bridge in well-known manner. Valve 704 may be coupled with valve driver module 322 of fluid management apparatus 100 through valve I/O terminal 908 and valve ground terminal 906 of terminal set 334 of connectivity port 830, with the activation of the appropriate combinations of transistors of the H-bridge actuating valve 704 clockwise or counter-clockwise as desired. The well-known charging/power supply scheme illustrated in FIG. 10B enables supply of power to valve 704.

FIG. 10C is a non-limiting, exemplary implementation of a valve actuator network module 324 (in conjunction with FIGS. 10A and 10B) in accordance with one or more embodiments of the present invention that may be used to activate or deactivate multiple networked valve modules 712 rather than a single valve 704, with each networked valve module 712 including their own valve driver module 322, rather than using the integrated valve driver module 322 of fluid management apparatus 100. Valve actuator network module 324 enables fluid management apparatus 100 to transmit and receive networked control data signals to and from valve modules 712 rather than mere transmission of switching signals to actuate a single valve 704. This way, each of the plurality of valve modules 712 associated with fluid management apparatus 100 may be provided independent set of instructions by CPU 302 of fluid management apparatus 100 for actuation. For example, an irrigation system may comprise of several hundred valve modules 712, with fluid management apparatus 100 instructing each individual valve module 712 when to open or close, for how long, and so on.

As detailed below, valve actuator network module 324 uses the same valve I/O terminal 908 and valve ground terminal 906 as the valve driver module 322, but instead, for transmission and receipt of networked control data signals instead of mere switching signals. Accordingly, valve I/O terminal 908 and valve ground terminal 906 have a dual use modes of either transmitting switching signal if only a single valve 704 is connected to the fluid management apparatus 100 or, alternatively, instead, transmit and receive networked control data signals if only valve modules 712 are networked with fluid management apparatus 100.

CPU 302 may address each valve module 712 (or a group thereof) to actuate any one or more valve modules 712 using networked control data signals (which may be in the form of signal packets) via valve I/O terminal 908 that may include valve module identification (or valve ID), including instructions such as time of actuation, duration of open or close, and so on (detailed below). To communicate over valve network VN 716, CPU 302 forwards networked control data signals (which may address a particular valve module 712 using valve ID for that valve module 712), instructing the particularly addressed valve module(s) 712 to actuate via a valve I/O terminal 908. The networked control data signals received by valve module(s) 712 are then used to drive the valve driver modules of valve module(s) 712, which may include their own respective H-bridge and power supplies.

The actual electrical circuit topography used to transmit and receive networked control data signals is very similar to network interface module 318 illustrated in FIG. 8B. As detailed below, valve I/O terminal 908 and a set of components of valve driver module 322 (approximately grouped within dashed box 1014 of FIG. 10A) may instead be used to transmit networked control data signals to valve modules 712. Also as detailed below, in cooperation with valve actuator network module 324 of fluid management apparatus 100, valve I/O terminal 908 may also be used to receive networked control data signals from valve modules 712 or other devices (detailed below).

For transmission of networked control data signals, as further detailed below, the set of components 1014 of the valve driver module 322 are related to the H-bridge (FIG. 10A). Dual use of valve I/O terminal 908 and dual use of valve driver module 322 to drive either a single valve 704 or, instead, alternatively, one or more valve modules 712 on valve network provides an efficient circuit design in terms of component use, cost, heat dissipation, complexity, and compact form-factor. However, as an alternative embodiment, an exclusive, discrete set of separate components may be used instead of the H-bridge components 1014 to provide communications capabilities over valve network VN 716 rather than double duty use of the component 1014 that are already part of H-bridge. Nonetheless, use of H-bridge components 1014 is possible due to low frequency or rate of transmission of networked control data signals from CPU 302 over the valve network VN 716, which is then communicated with valve modules 712.

As indicated above, transmission methodology of networked control data signals over valve network VN 716 is very similar to operations of network interface module 318 illustrated in FIG. 8B. As best illustrated in FIG. 10A, CPU 302 transmits networked control data signals via terminal 1012, which bias ON inverter Q14 (similar to terminal 814 biasing ON transistor Q1 in FIG. 8B). The actuation of inverter transistor Q14 biases ON transistor Q12, which is a similar operation to transistor operations of transistor Q1 and transistor 818 of FIG. 8B. Networked control data signals are transmitted via valve I/O terminal 908 via ON/OFF condition of transistor Q12. Transistor Q5 is biased ON via terminal 1010 by CPU 302 to pull valve ground terminal 906 to ground. As with current limiter 806 of network interface module 318 of FIG. 8B, valve driver module 322 and valve actuator network module 324 also include a current limiter 1016, which is activated based on CPU 302 signal input to terminal 1018.

A number of valve modules 712 may also be coupled with fluid management apparatus 100, wherein, any one of the coupled valve module 712 may be charged by power supply illustrated in FIG. 10B through valve I/O terminal 908 while no networked control data signals is transmitted or received. As detailed below, power switching circuit module 1004 may be used to charge batteries of the valve modules 712 via valve I/O terminal 908, and stop the charging when CPU 302 issues a networked control data signals on valve I/O terminal 908 to instruct one or more valve module 712.

Prior to transmission of networked control data signals to control or instruct an addressed valve module 712, CPU 302 stops charging processes by biasing a valve power terminal 1002 (FIG. 10C) to bias ON transistor Q8. Biasing ON transistor Q8 biases OFF transistor Q7, which stops the charging of valve power supplies (e.g., valve batteries of valve modules 712) while networked control data signals from CPU 302 are transmitted through valve I/O terminal 908 to instruct valve module(s) 712.

As indicated above, valve I/O terminal 908 is both an input as well as an output terminal. Therefore, CPU 302 may also receive information from a coupled device via valve I/O terminal 908. As illustrated in FIG. 10C, just as the transmission, the receipt and processing of electrical signals at valve I/O terminal 908 is identical to operations of network interface module 318, using the same circuit topography. As a non-limiting example of a device that may be connected to fluid management apparatus 100 via valve I/O terminal 908, a moisture detector local to a specific valve may forward information about presence or absence of moisture at the location of the valve via valve I/O terminal 908 and receiver terminal 1006 (FIG. 10C) to the CPU 302. Further, CPU 302 may in turn, forward a shut-OFF valve signal to a particular valve 712 via valve I/O terminal 908. The electrical operations for processing of received signals from the connected device is the same as those described in relation to network interface module of FIG. 8B.

FIGS. 11A to 11E are non-limiting, exemplary flowcharts that detail a few exemplary use-profiles of fluid management apparatus in accordance with one or more embodiments of the present invention. Fluid management system 100 is comprised of one or more use-profiles, with each use-profile including functions based on one or more criteria specific to an environment within which fluid is manage. Non-limiting examples of functions of a use-profile may include operations related to flow profile, scheduling, various counters, processing of I/O signals from one or more connected devices, changing or switching a state of one or more connected devices such as one or more valves, etc.

In general, the functions of a use-profile may include a set of attributes the values of which enable management of the fluid. At minimum, use-profiles operate based on the flow profile function (detailed in FIGS. 12A and 12B). As detailed below, a flow profile is comprise of a set of flow characteristics with predetermined set of ranges of values that enables CPU 302 to determine the nature or type of a flow of fluid being detected. Accordingly, fluid management apparatus 100 provides one or more use-profiles that at minimum operate based on a predetermined set of ranges of values of a set of flow characteristics of a flow profile of a fluid, with a use-profile selected based on one or more criteria specific to an environment within which fluid is managed.

The following are non-limiting, very specific examples of a few use-profiles for management of fluid, which may be applicable for a single appliance such as a faucet in an establishment or an entire complex system such as an irrigation system.

Use Profile—Example 1

Figure 11A:
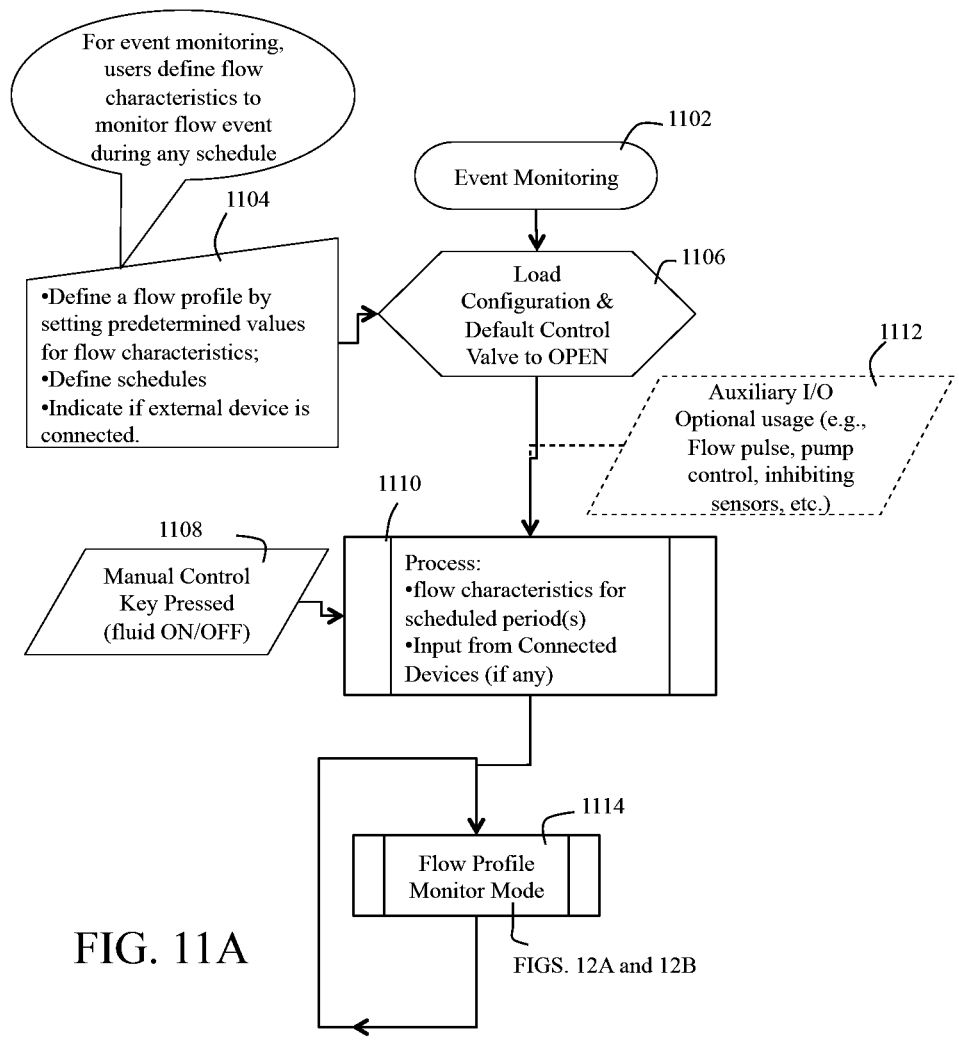
FIGS. 11A to 11E are non-limiting, exemplary flowcharts that detail a few exemplary use-profiles of fluid management apparatus in accordance with one or more embodiments of the present invention.

FIG. 11A is a non-limiting, exemplary flow diagram for monitoring an event in accordance with one or more embodiments of the present invention. An event (or an occurrence) may be specific to a single appliance or an entire system. As illustrated in FIG. 11A, users may select event monitor profile at operation 1102 and set values related to the attributes of various functions at operation 1104 related to event monitor profile, which may include any one or more of a flow characteristics of the flow profile, scheduled times, etc. for event monitoring use-profile. For example, users select a set of flow characteristics of a flow profile most appropriate for the event monitoring use-profile and set predetermined set of ranges of values for each selected flow characteristics. Additionally, operation 1104 may also include functionality with respect to indication if an external device (e.g., a switching device such as a pump control, or various other sensors such as a level sensor, or other types of sensors such as inhibiting sensors, etc.) is to be connected to fluid management apparatus 100. Selections may be done through user interface 218 best illustrated in FIGS. 2A and 2B.

At operation 1106, CPU 302 loads configurations for the various selected functions related to the event monitoring use-profile in well known manner from memory module 310, and based on the selected use-profile and data entered at operation 1104 via user interface 218, CPU 302 sets the default state of the control valve, which in this non-limiting, exemplary instance for event monitoring use-profile is an open state.

CPU 302 at operation 1110 commences processing flow characteristics for scheduled period(s) as defined in operation 1104 after receiving a start signal at operation 1108 (from ON button 230 on the user interface 218). If at operation 1104 users define the event monitoring operation 1102 to also communicate with an externally connected device, then CPU 302 also communicates input/output signals from and to external device(s) at operation 1112 with the connected devices via auxiliary I/O terminals 904 and 910 of FIG. 9.

At operation 1114 CPU 302 monitors fluid flow by receiving input from one or more sensor (best illustrated in relation to FIGS. 4A to 6B), which enables CPU 302 to determine if any one or more of the users' set conditions (values set for the attributes of the function) at operation 1104 related to profile flow function have been breached and if so, CPU 302 closes the valve with a user resetting all the registers to configured conditions. This enables CPU 302 to set the valve back to a normally open condition for event monitoring profile.

Use Profile—Example 2

Figure 11B:
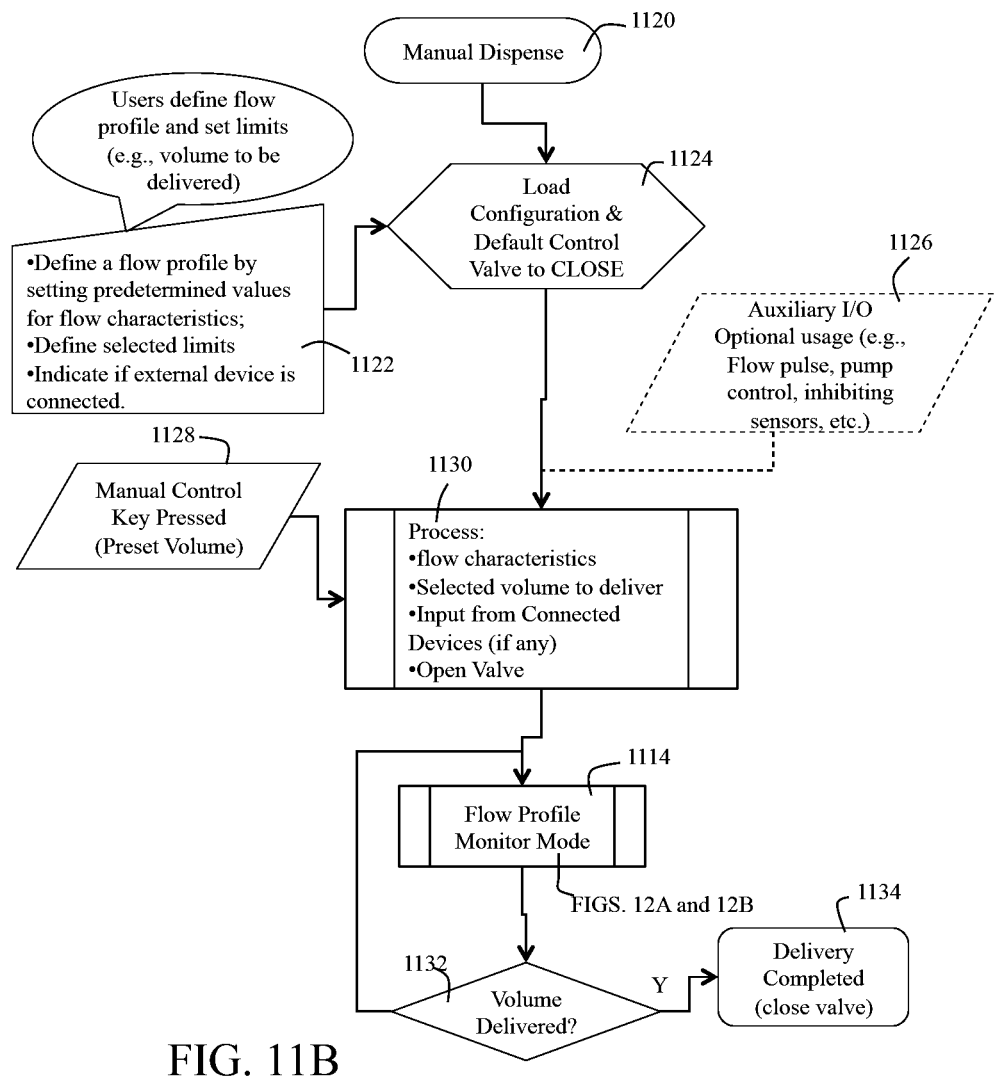

FIG. 11B is a non-limiting, exemplary flow diagram for manual dispense use-profile in accordance with one or more embodiments of the present invention. As illustrated, users select manual dispense use-profile at operation 1120 and set values to various attributes related to selected functions (e.g., flow profile, scheduling, counters, etc.) of the selected use-profile at operation 1122. Manual dispense use-profile enables for delivery of specific volume of fluid.

At operation 1124, CPU 302 loads configurations for the various functions related to the manual dispense use-profile in well known manner from memory module 310, and based on selected use-profile and data entered at operation 1122 via user interface 218, CPU 302 sets the default state of the control valve, which in this non-limiting, exemplary instance is closed state.

It should be noted that in this non-limiting, exemplary instance, since it is a manual operation, the user must select ON/Start key 230 illustrated in FIGS. 2A and 2B at operation 1128 to commence processing of manual dispense use-profile functions at operation 1130. That is, operation 1128 instructs CPU 302 to open the valve at operation 1130 to start delivery of fluid, including processing of other indicated functions (defined at operation 1122). If at operation 1104 users define the manual dispense use-profile to also communicate with an externally connected device, then CPU 302 also communicates input/output signals from and to external device(s) at operation 1126 with the connected devices via auxiliary I/O terminals 904 and 910 of FIG. 9.

Thereafter, at operation 1132, CPU 302 determines if a correct volume of fluid has been delivered, determination of which is based on data from flow profile at operation 1114. If the CPU 302 determines that a correct volume of fluid has been delivered at operation 1132, CPU 302 determines that the delivery of fluid is complete and closes valve at operation 1134.

Use Profile—Example 3

Figure 11C:
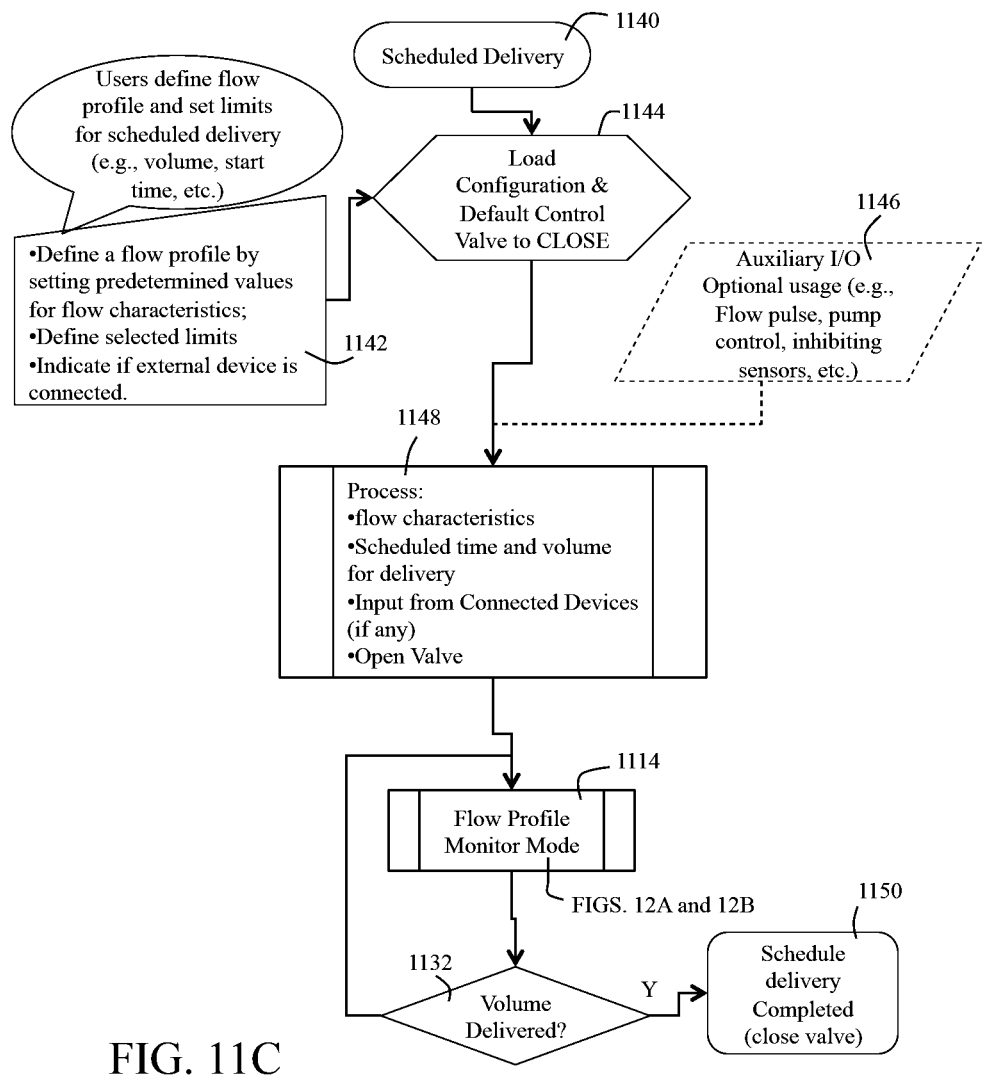

FIG. 11C is a non-limiting, exemplary flow diagram for a scheduled delivery use-profile in accordance with one or more embodiments of the present invention. As illustrated, users select scheduled delivery use-profile at operation 1140 and set values to various attributes related to selected functions (e.g., flow profile, scheduling, counters, etc.) of the selected use-profile at operation 1142. Scheduled delivery use-profile enables delivery of specific volume of fluid in accordance with some schedule.

At operation 1144, CPU 302 loads configurations for the various functions related to the manual dispense use-profile in well known manner from memory module 310, and based on the selected use-profile and data entered at operation 1142 via user interface 218, CPU 302 sets the default state of the control valve, which in this non-limiting, exemplary instance is closed state.

CPU 302 at operation 1148 commences processing flow characteristics for scheduled period(s) as defined in operation 1142, including opening valve. If at operation 1142 users define the scheduled delivery operation 1140 to also communicate with an externally connected device, then CPU 302 also communicates input/output signals from and to external device(s) at operation 1146 with the connected devices via auxiliary I/O terminals 904 and 910 of FIG. 9.

Thereafter, at operation 1132, CPU 302 determines if a correct volume of fluid has been delivered in accordance with the schedule defined at operation 1142, determination of which is based on entered schedule and data from flow profile at operation 1114. If the CPU 302 determines that a correct volume of fluid has been delivered in accordance with set schedule at operation 1132, CPU 302 determines that the scheduled delivery of fluid is complete and closes valve at operation 1150.

Use Profile—Example 4

Figure 11D:
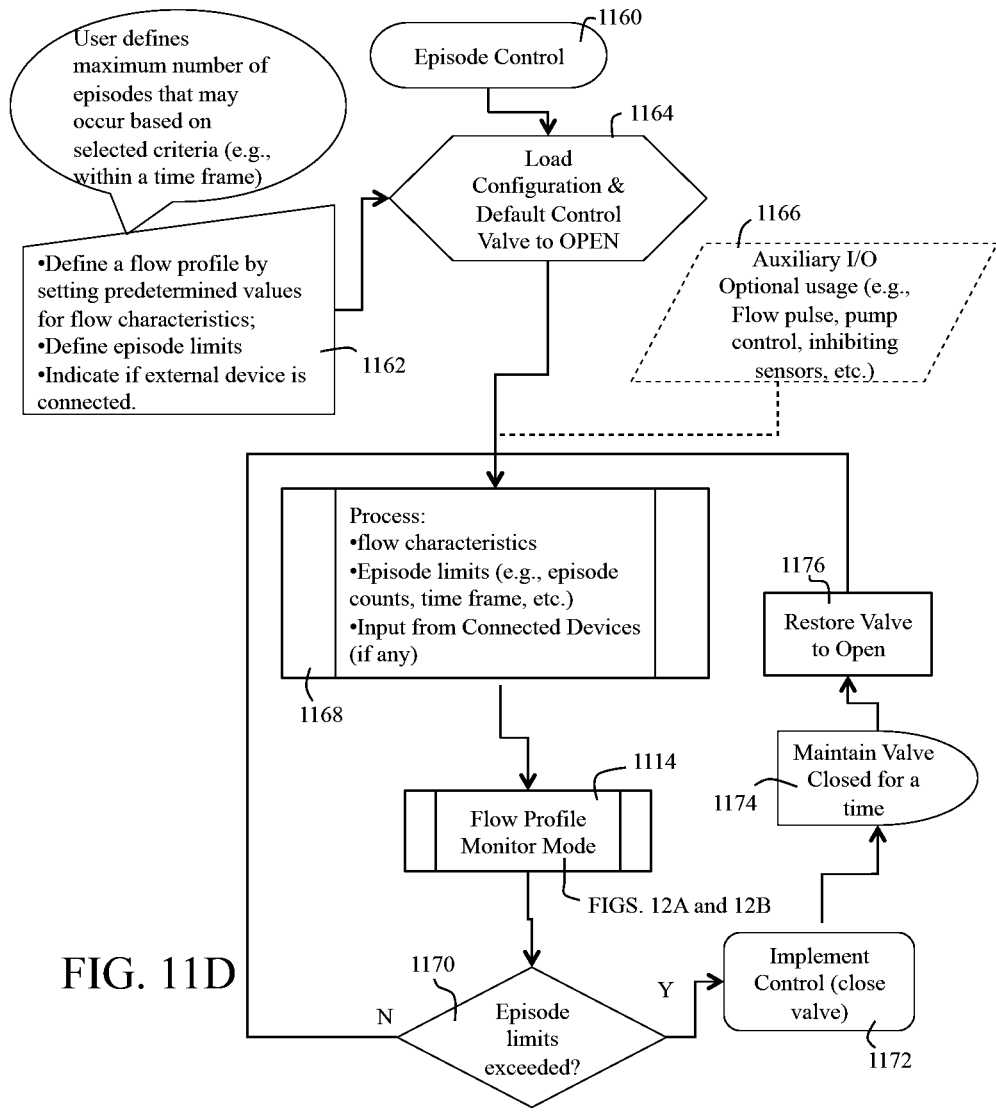

FIG. 11D is a non-limiting, exemplary flow diagram for episode control use-profile in accordance with one or more embodiments of the present invention. As illustrated, users select episode control use-profile at operation 1160 and set values to various attributes related to selected functions (e.g., flow profile, scheduling, counters, timers, etc.) of the selected use-profile at operation 1162.

Episode control use-profile provides a limit for a number of times an event occurs within a time frame. For example, episode control use-profile may be used to limit the number of times a faucet is turned ON and OFF per some unit of time. For example, turning a faucet ON and OFF 10 times in 2 minutes may cause CPU 302 to shut-off fluid flow to that particular faucet. Accordingly, at minimum, episode control use-profile would require timer and counter functions as well as flow profile functionality.

As further illustrated in FIG. 11D, at operation 1164, CPU 302 loads configurations for the various selected functions related to the episode control use-profile in well known manner from memory module 310, and based on selected use-profile and data entered at operation 1162 via user interface 218, CPU 302 sets the default state of the control valve, which in this non-limiting, exemplary instance is an open state.

CPU 302 at operation 1168 commences processing flow characteristics and episode limits (counts, timers, flow profile, etc.) as defined in operation 1162. If at operation 1162 users define the episode control use-profile operation 1160 to also communicate with an externally connected device, then CPU 302 also communicates input/output signals from and to external device(s) at operation 1146 with the connected devices via auxiliary I/O terminals 904 and 910 of FIG. 9.

Thereafter, at operation 1170, CPU 302 determines if episode limits have exceeded in accordance with the set limits (counters, timers, etc.) defined at operation 1162, determination of which may also be based on data from flow profile at operation 1114. If the CPU 302 determines that any one or more of the episode limits have exceeded at operation 1170, CPU 302 closes valve at operation 1172, and resets valve to normally open condition for episode control at operation 1176 after a predetermined delay at operation 1174, the timing for which is set at operation 1162.

Use Profile—Example 5

Figure 11E:
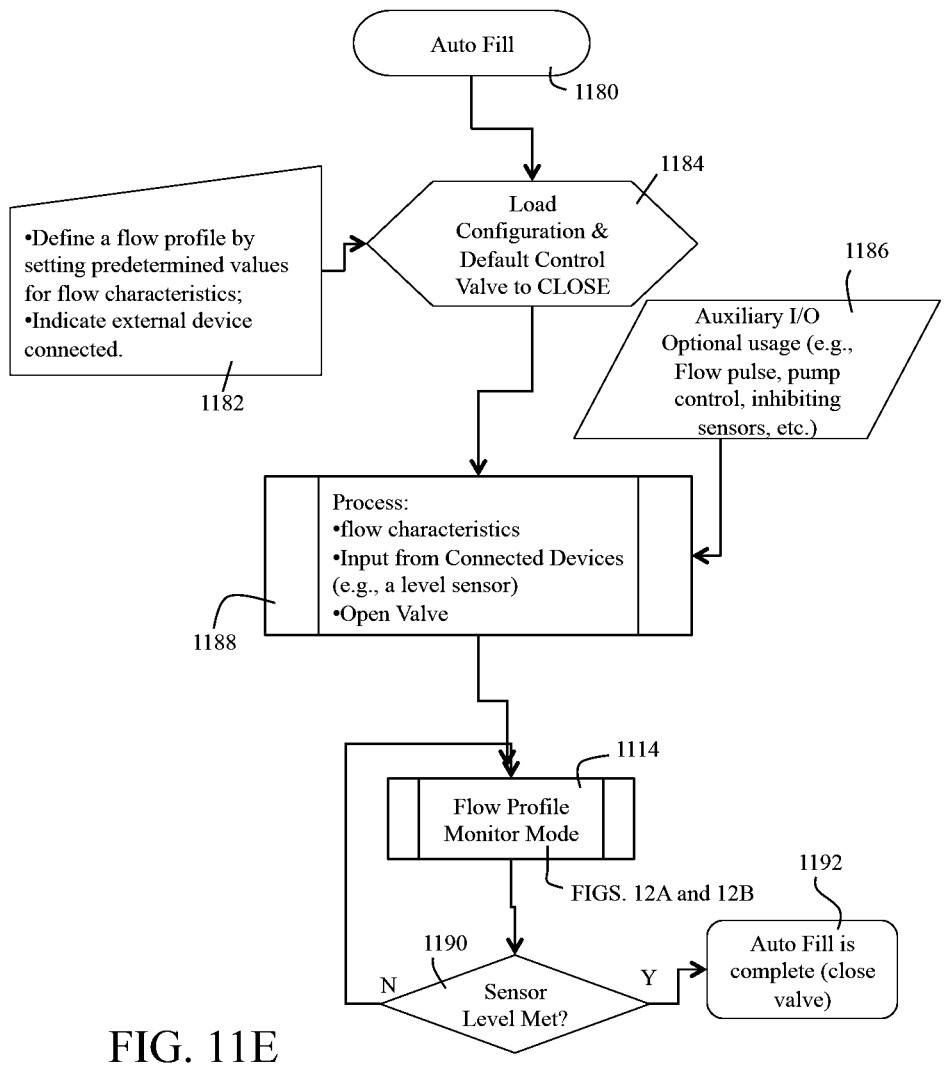

FIG. 11E is a non-limiting, exemplary flow diagram for auto-fill use-profile to automatically fill a vessel in accordance with one or more embodiments of the present invention. As illustrated, users select auto-fill use-profile at operation 1180 and set values to various attributes related to selected functions (e.g., flow profile, scheduling, counters, etc.) of the selected use-profile at operation 1182.

At operation 1184, CPU 302 loads configurations for the various selected functions related to the auto-fill use-profile in well known manner from memory module 310, and based on selected use-profile and data entered at operation 1182 via user interface 218, CPU 302 sets the default state of the control valve, which in this non-limiting, exemplary instance is a closed state.

CPU 302 at operation 1188 commences processing flow characteristics as defined in operation 1182, including opening valve. If at operation 1182 users define the auto-fill user-profile operation 1180 to also communicate with an externally connected device, then CPU 302 also communicates input/output signals from and to external device(s) at operation 1186 with the connected devices via auxiliary I/O terminals 904 and 910 of FIG. 9.

Thereafter, at operation 1190, CPU 302 determines if a correct level of vessel is reached defined at operation 1142 and sensed by a level sensor at operation 1186, further determination of which is based on data from flow profile at operation 1114. If CPU 302 determines that a level of fluid has been reached for the vessel at operation 1190, CPU 302 determines that the auto-fill is complete and closes valve at operation 1192.

Figure 12A:
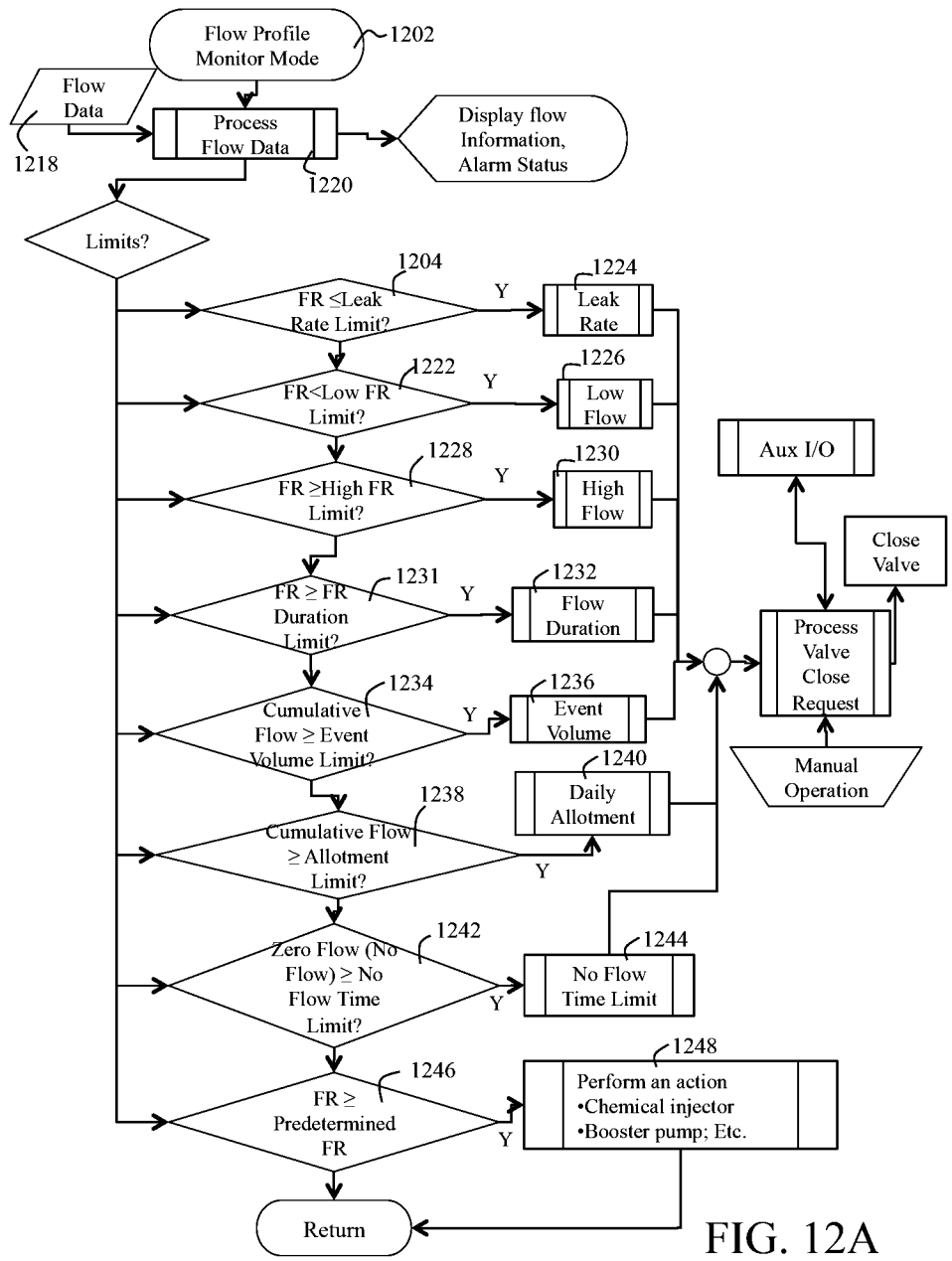
FIG. 12A is a non-limiting, exemplary flow diagrams for monitoring a non-limiting, exemplary set of flow characteristics of a flow profile in accordance with one or more embodiment of the present invention.
Figure 12B:
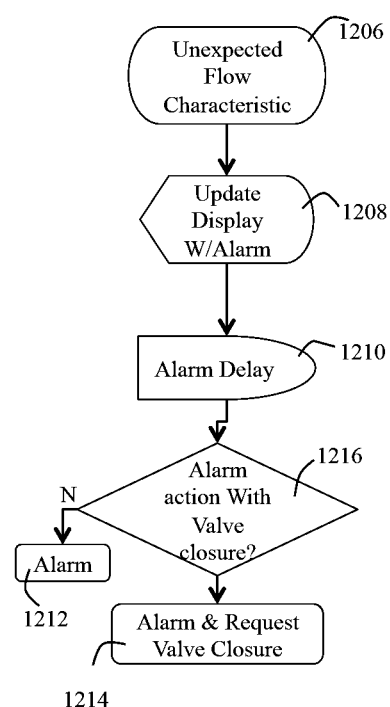
FIG. 12B is a non-limiting, exemplary flow diagram implementation of predefined processes for unexpected flow characteristics in accordance with one or more embodiments of the present invention.

FIGS. 12A and 12B are non-limiting, exemplary flow diagrams for monitoring a non-limiting, exemplary set of flow characteristics of a flow profile in accordance with one or more embodiment of the present invention. CPU 302 may be provided with a flow profile monitor mode operations (FIGS. 12A and 12B) that enable monitoring a predetermined set of ranges of values of a set of flow characteristics, which enable CPU 302 to determine if a value of a flow characteristic is outside of expected flow operations for any one of the one or more functions of a use profile. If CPU 302 does determine unexpected values of flow profiles for a specific use-profile, CPU 302 commences a set of operations (i.e., functions) indicative of a malfunction related to the monitored flow characteristic for that use-profile.

It should be noted that flow profile monitor mode operations 1202 of CPU 302 enable monitoring a set of expected flow values of a set of flow characteristics of a flow profile, which can be as specific as for a single appliance or as complex as an entire system such as an irrigation system or an office building rather than a single faucet, for example. If CPU 302 (based on flow profile monitor mode operations 1202) determines that a value of a flow characteristic for a specific use-profile or appliance is outside of the set of expected flow values for the use-profile, CPU 302 commences a set of operations (FIG. 12B) indicative of a malfunction related to the monitored flow characteristic. The set of operations indicative of the malfunction related to the monitored flow characteristic may comprise of actuation of one or more devices associated with the fluid management apparatus 100 that are indicative of unexpected flow values of the monitored flow characteristic. Non-limiting, non-exhaustive listing of examples of one or more devices may include, for example, any one or more of an alarm that may be specific for that flow characteristic, one or more valves, one or more booster pumps, one or more chemical injectors, etc.

Referring to FIG. 12A, flow profile monitor mode operations 1202 are based on flow data 1218 received by pre-defined operations 1220 discussed in relation to FIGS. 4A to 6D. Assuming CPU 302 has obtained the proper flow information (e.g., a flow rate, volume, etc.) at operation 1220, CPU 302 monitors flow profile for a use-profile.

CPU 302 may determine various flow characteristics of a flow profile including for example, if a flow rate (FR) is less than or equal to a predetermined threshold value (e.g., predetermined flow rate that may constitutes a leak) at operation 1204. In this instance, no device is open to allow any flow and hence, if flow exists and the flow rate is detected that is below or equal to a predetermined threshold value (or leak rate limit defined as leakage), then CPU 302 would determine that a leakage exists and process pre-defined operations related to leak rate at operation 1224 (detailed in FIG. 12B).

It should be noted that values for attributes of functions of use-profiles and flow characteristics of flow profiles may be set for different date and or time zones. For example, as detailed below a high flow limit flow characteristic may be set to a first value (e.g., 10 gallon per minute) for morning times (allowing for shower, wash, etc.) whereas a second value (less than the first value) may be set for the same high flow limit for midday (e.g., 2 gallons per minute where the house is empty). Depending on building and use, the opposite may be configured for office buildings where during midday the office building is full and hence the value set for the attribute "High Flow Limit" may be at a much higher level (e.g., 1000 galleons per minute) than during night hours (e.g., 100 gallons per minute). The same is true for other attributes for all of the other use-profile functions, including timers, counters, etc. Accordingly, a flow profile and its set of flow characteristics may vary greatly depending on the use-profile selected.

To continue with operations of flow profile monitoring mode 1202, CPU 302 may further determine various flow characteristics of a flow profile including for example, if a flow rate (FR) is less than a low flow rate limit at operation 1222. This may be an indication of an obstruction (e.g., clogged pipe) within a flow as the expected (or normal) flow rate must be higher than the low flow rate limit for a particular system or specific appliance. This is not a leakage as the device or system is open to allow flow, but the flow rate is below some expected minimum. If flow rate is detected that is below or equal to a predetermined threshold value (or low flow rate limit), then CPU 302 may process predefined operations related to low flow rate detections at operation 1226 (detailed in FIG. 12B).

CPU 302 may further determine various flow characteristics of a flow profile including for example, if a flow rate is greater than or equal to a predetermined high flow rate at operation 1228. In this instance, the flow rate exceeds expected flow rate of a device or system. For example, this may be an indication of a rupture of a pipe where more fluid flows out of the pipe than a system or device may possible allow. If CPU 302 determines that the flow rate is greater than or equal to a predetermined high flow rate, CPU 302 may process predefined operations related to high flow rate detections at operation 1230 (detailed in FIG. 12B).

CPU 302 may also determine various flow characteristics of a flow profile including for example, if a flow rate is greater than or equal to a flow rate duration limit at operation 1231. For example, the duration of flow rate should not exceed certain time limit, and hence, if exceeded, a malfunction may exist with respect to a timer switch. If CPU 302 determines that the flow rate is greater than or equal to a predetermined flow rate duration limit, CPU 302 may process predefined operations related to flow rate duration detections at operation 1232 (detailed in FIG. 12B).

CPU 302 may additionally determine various flow characteristics of a flow profile including for example, if a cumulative flow is greater than or equal to a predetermined event volume limit at operation 1234. For example, no event should use more than 50 gallons of water. This would mean that for any specific even (e.g. taking shower), cumulative flow should not exceed the event volume limit (e.g., shower using more than 50 gallons). Accordingly, if cumulative flow does exceed a predetermined threshold value limit, then CPU 302 may process predefined operations related to excess volume usage at operation 1236 (detailed in FIG. 12B).

CPU 302 may also determine various flow characteristics of a flow profile including for example, if a cumulative flow (total volume of fluid) is greater than an allotment limit per period of time at operation 1238. For example, a particular application may require no more than a predetermined volume of fluid daily (24 hours). Accordingly, if cumulative flow does exceed a predetermined allotment per time limit, CPU 302 may process predefined operations related to excess usage of fluid above an allotment per time at operation 1240 (detailed in FIG. 12B).

CPU 302 may further determine various flow characteristics of a flow profile including for example, requirements for flows at operation 1242. This would mean that if no flow occurs for more than a predetermined set time, CPU 302 may process predefined operations related to zero flow at operation 1244 (detailed in FIG. 12B). For example, a nuclear facility may have a time limit where for example, a fluid coolant flow may stop for no more than a time limit (e.g., 3 hours) for cooling various systems and therefore, if no coolant flow is detected passed the no flow time limit (where no coolant flow has been detected for the exemplary 3 hours), then an alarm may be triggered. This insures that the system is using fluid as it should.

CPU 302 may also determine various flow characteristics of a flow profile including for example, if FR is greater than or equal to a predetermined FR at operation 1246. If CPU 302 determines that flow rate is greater than or equal to a predetermined flow rate, CPU 302 may perform one or more actions based on operating profile (application) at operation 1248. For example, at a certain flow rate, CPU 302 may activate a booster pump to boost fluid pressure for normal operation of sprinklers for an irrigation system. As another example, at a certain flow rate, CPU 302 may shut-off a certain set of valve and activate others and so on.

FIG. 12B is a non-limiting, exemplary flow diagram implementation of predefined processes (1224 to 1244 of FIG. 12A) for unexpected flow characteristics in accordance with one or more embodiments of the present invention. If CPU 302 determines that the flow rate has an unexpected value, CPU 302 may update display with alarm indications at operation 1208 for that flow characteristic, and based on a predetermined set of user input (determined at operation 1216), either trigger an alarm only at operation 1212 or, alternatively, trigger an alarm and request valve closure at operation 1214 after a predetermined time delay at operation 1210. Alarm display information at operation 1208 and delay time periods at operation 1210 may be different for each flow characteristic of a flow profile. As a non-limiting, specific example, if CPU 302 determines that the flow rate is less than leak rate limit at operation 1204, CPU 302 may update display with alarm indications at operation 1208 for leakage, and based on a predetermined set of user input (determined at operation 1216), either trigger an alarm only at operation 1212 to indicate leakage or, alternatively, trigger an alarm and request valve closure at operation 1214 after a predetermined time delay (for leakage) at operation 1210.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A microprocessor controlled method for management of fluid, comprising:
   providing one or more use-profiles;
   selecting a use-profile from the one or more use-profiles;
   determining a flow profile of the use-profile by:
   monitoring a predetermined set of ranges of values of a set of flow characteristics of a flow profile of a fluid associated with one or more appliance used in the use-profile;
   determining if a value of a flow characteristic of the set of flow characteristics is an unexpected flow characteristic value for the flow profile of the one or more appliance; and
   initiating a set of operations indicative of unexpected flow characteristic;
   wherein: the set of flow characteristics comprise:
   a flow rate in relation to a leak rate limit;
   the flow rate in relation to a low flow rate limit;
   the flow rate in relation to a high flow rate limit;
   the flow rate in relation to a flow rate duration limit;
   a cumulative flow in relation to an event volume limit;
   the cumulative flow in relation to allotment limit;
   a no flow in relation to no flow time limit; and
   the flow rate in relation to a predetermined flow rate for operating on an appliance of one or more appliance at a predetermined flow rate;
   the use-profile is selected based on one or more criteria specific to an environment within which fluid is managed;
   the use-profile is a manual dispense profile with an expected flow profile for manual dispense of fluid with a controlling valve set to close;
   commencing manual dispense profile by activating a user interface actuator which enables opening of the controlling valve to enable a flow of fluid;
   delivering a specific volume of fluid while commencing monitoring of the flow of fluid to detect deviations from expected flow profile;
   wherein the controlling valve closes when the specific volume of fluid is delivered or if deviations from expected flow profile are detected.

2. The microprocessor controlled method for management of fluid as set forth in claim 1, wherein:
   the use-profile is an event monitor profile with an expected flow profile for a flow event that sets a controlling valve to open and commences monitoring of the flow event to detect deviations from expected flow profile;
   wherein a defined set of processes are initiated if deviations from expected flow profile are detected.

3. The microprocessor controlled method for management of fluid as set forth in claim 1, wherein:
   the use-profile is a scheduled delivery profile with an expected flow profile for scheduled delivery of fluid with a controlling valve set to close;
   commencing scheduled delivery profile by activating a user interface actuator which enables opening of the controlling valve;
   delivering a specific volume of fluid in accordance with a predefined schedule while commencing monitoring of the flow of fluid to detect deviations from expected flow profile;
   wherein the controlling valve closes when the specific volume of fluid is delivered in accordance with the predefined schedule or if deviations from expected flow profile are detected.

4. The microprocessor controlled method for management of fluid as set forth in claim 1, wherein:
   the use-profile is an episode control profile with an expected flow profile for an episode control of fluid, including expected limits of one or more parameters of an episode, with a controlling valve set to open for episode control;
   commencing monitoring of a flow of fluid to detect deviations from expected flow profile and expected limits of one or more parameters of the episode;
   wherein the controlling valve closes when the expected limits of one or more parameters of the episode are breached or if deviations from expected flow profile are detected; and
   wherein: the controlling valve resets to open based on a set of criteria.

5. The microprocessor controlled method for management of fluid as set forth in claim 1, wherein:
   the use-profile is a fill vessel profile with an expected flow profile for filling a vessel with a controlling valve set to close;
   commencing monitoring of a flow of fluid to detect deviations from expected flow profile and expected limits of one or more parameters of fill vessel profile;
   wherein the controlling valve closes when the expected limits of one or more parameters of the fill vessel profile are breached or if deviations from expected flow profile are detected.

6. The microprocessor controlled method for management of fluid as set forth in claim 1, wherein
   the flow profile is determined by:
   monitoring the predetermined set of ranges of values of the set of flow characteristics;
   determining if a value of the flow characteristic of the set of flow characteristics is an unexpected flow value;
   if the value is determined to be unexpected,
   commencing initiating a set of operations indicative of unexpected flow characteristic.

* * * * *